(12) United States Patent
Rastegar et al.

(10) Patent No.: US 8,587,473 B2
(45) Date of Patent: Nov. 19, 2013

(54) SYSTEM AND METHOD FOR ROLL ANGLE INDICATION AND MEASUREMENT IN FLYING OBJECTS

(75) Inventors: Jahangir S. Rastegar, Stony Brook, NY (US); Carlos M. Pereira, Tannersville, PA (US)

(73) Assignee: Omnitek Partners LLC, Ronkonkoma, NY (US)

( * ) Notice: Subject to any disclaimer, the term of this patent is extended or adjusted under 35 U.S.C. 154(b) by 0 days.

(21) Appl. No.: 13/474,701

(22) Filed: May 17, 2012

(65) Prior Publication Data

US 2012/0228423 A1    Sep. 13, 2012

Related U.S. Application Data

(63) Continuation of application No. 12/623,432, filed on Nov. 22, 2009, now Pat. No. 8,258,999, which is a continuation-in-part of application No. 12/395,758, filed on Mar. 2, 2009, now Pat. No. 7,977,613.

(51) Int. Cl.
*G01S 13/66* (2006.01)
*G01C 1/00* (2006.01)
*G01S 13/00* (2006.01)
*F42B 30/00* (2006.01)

(52) U.S. Cl.
USPC .................. 342/62; 342/5; 342/61; 342/175; 342/188; 342/195; 244/3.1; 244/3.11; 244/3.14; 244/3.15; 244/3.21; 244/3.23

(58) Field of Classification Search
USPC ........ 244/3.1–3.3; 342/61, 62, 175, 188, 195, 342/5–11; 343/700 R, 705, 767–771
See application file for complete search history.

(56) References Cited

U.S. PATENT DOCUMENTS

| | | | | |
|---|---|---|---|---|
| 6,098,547 A * | 8/2000 | West | ............................ | 244/3.14 |
| 6,724,341 B1 * | 4/2004 | Pereira et al. | .................. | 244/3.1 |
| 6,727,843 B1 * | 4/2004 | Hansen | ..................... | 244/3.1 |
| 7,193,556 B1 * | 3/2007 | Pereira et al. | .................. | 244/3.1 |
| 7,425,918 B2 * | 9/2008 | Rastegar et al. | ................ | 244/3.1 |
| 7,977,613 B2 * | 7/2011 | Rastegar et al. | ................ | 244/3.1 |
| 8,076,621 B2 * | 12/2011 | Rastegar et al. | ................ | 244/3.1 |
| 8,093,539 B2 * | 1/2012 | Rastegar | ...................... | 244/3.19 |
| 8,125,398 B1 * | 2/2012 | Paulsen | ...................... | 244/3.14 |
| 8,138,982 B1 * | 3/2012 | West et al. | ..................... | 244/3.14 |
| 8,258,999 B2 * | 9/2012 | Rastegar et al. | ................ | 342/62 |
| 2007/0001051 A1 * | 1/2007 | Rastegar et al. | ................ | 244/3.1 |
| 2010/0059622 A1 * | 3/2010 | Rastegar et al. | ............. | 244/3.11 |

* cited by examiner

*Primary Examiner* — Bernarr Gregory

(57) ABSTRACT

A method for onboard determination of a roll angle of a projectile. The method including: transmitting a polarized RF signal from a reference source, with a predetermined polarization plane; receiving the signal at a pair of polarized RF sensor cavities positioned symmetrical on the projectile with respect to a reference roll position on the projectile; measuring a difference between an output of the pair of polarized RF sensor cavities resulting from the received signal to determine zero output roll positions of the projectile; and comparing an output of the pair of polarized RF sensor cavities at each of the zero output positions to determine when the projectile is parallel to the predetermined polarization plane. The method can also include analyzing an output of at least one third sensor positioned on the projectile to determine whether the roll angle position of the projectile is up as compared to the horizon.

12 Claims, 14 Drawing Sheets

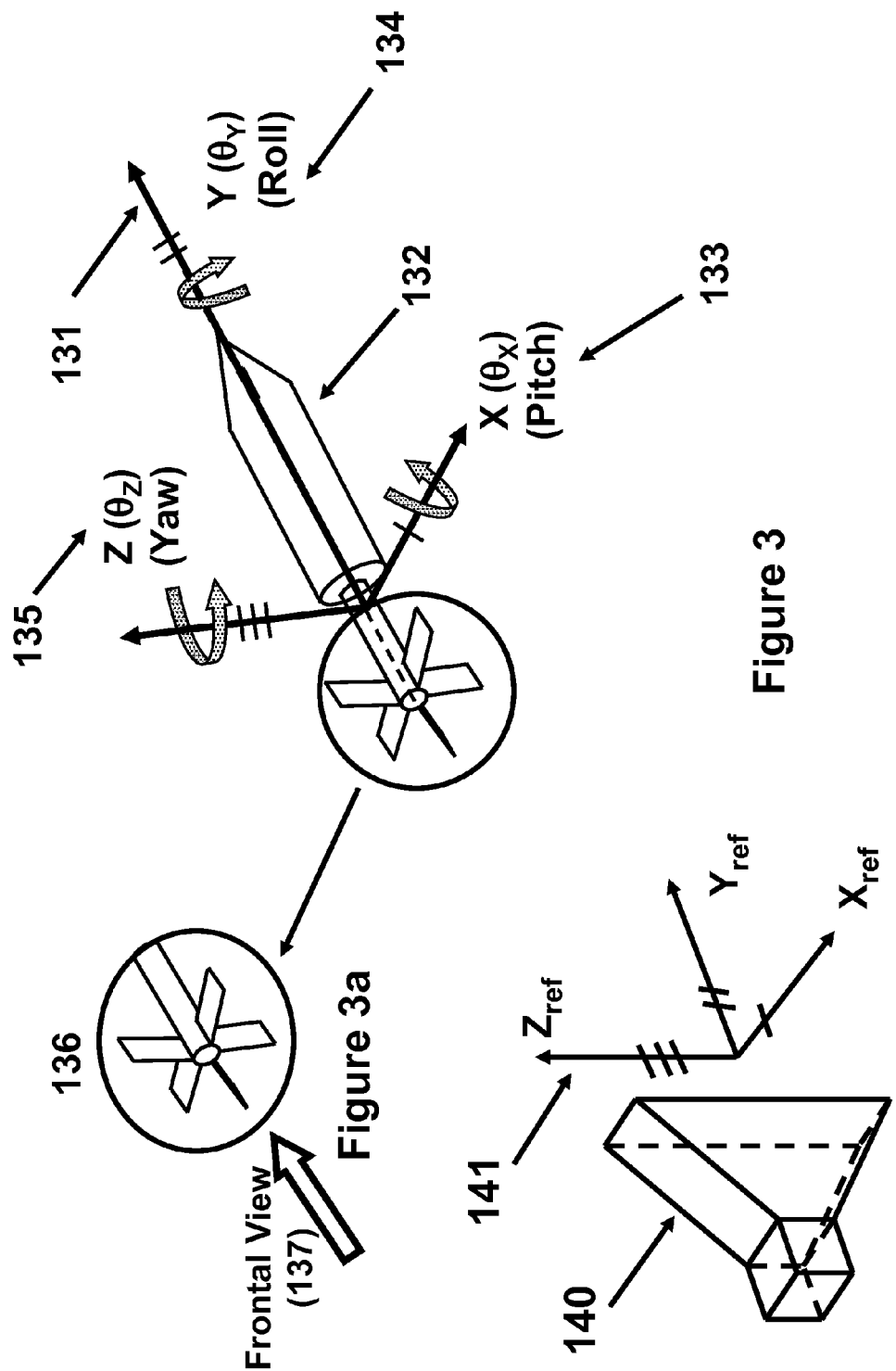

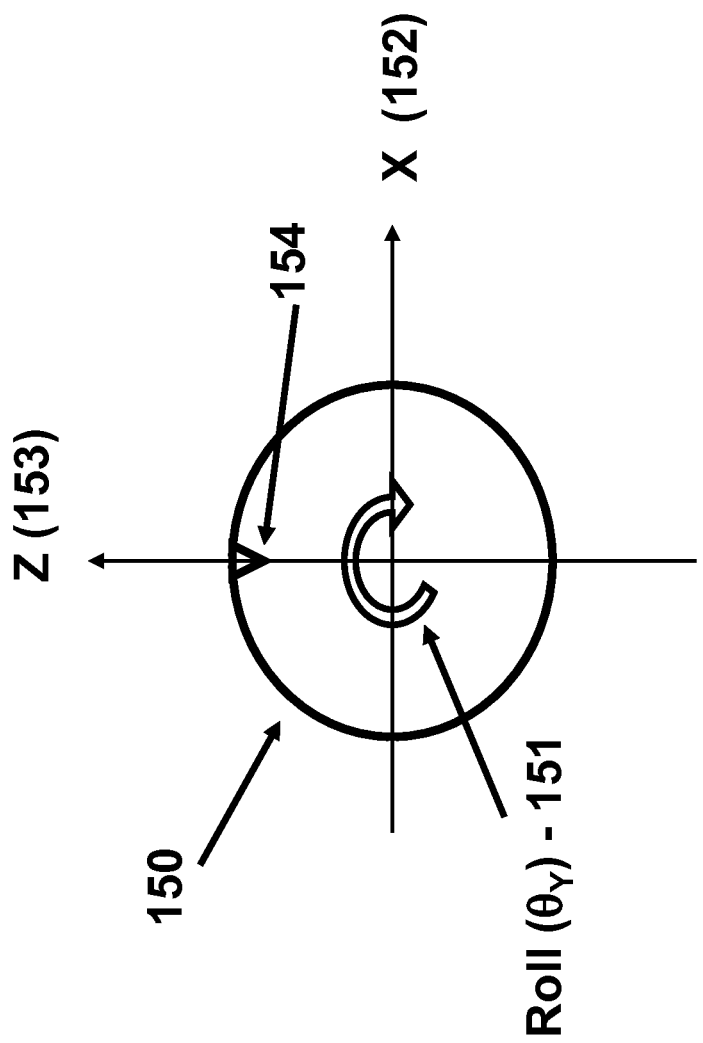

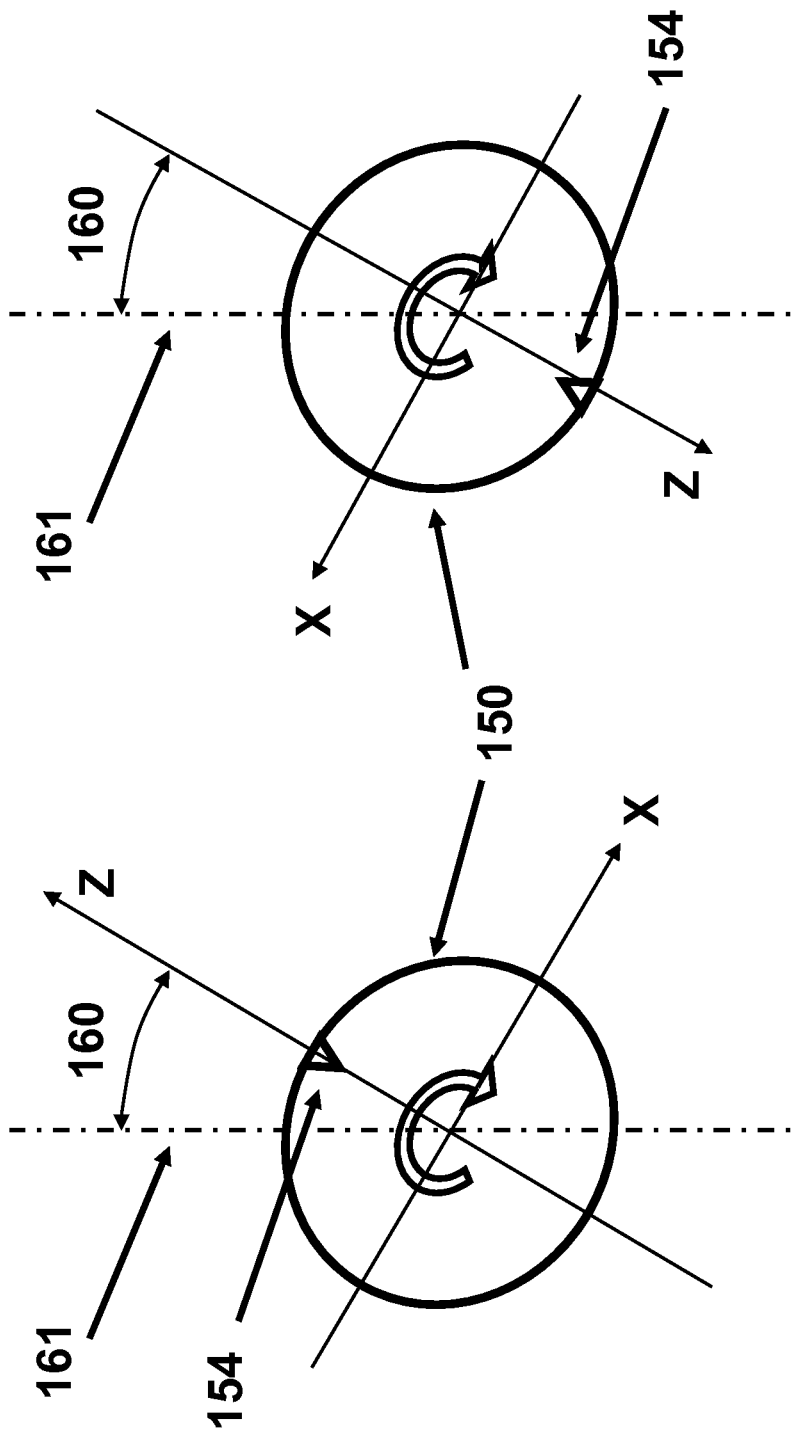

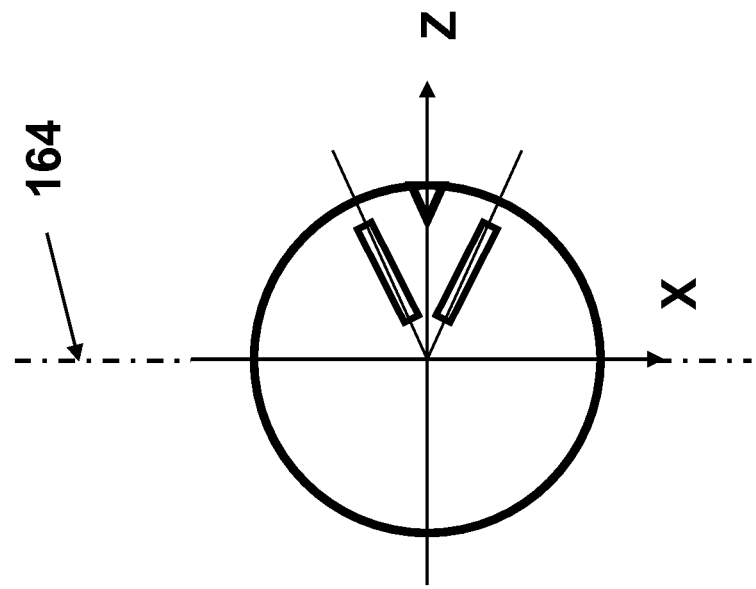
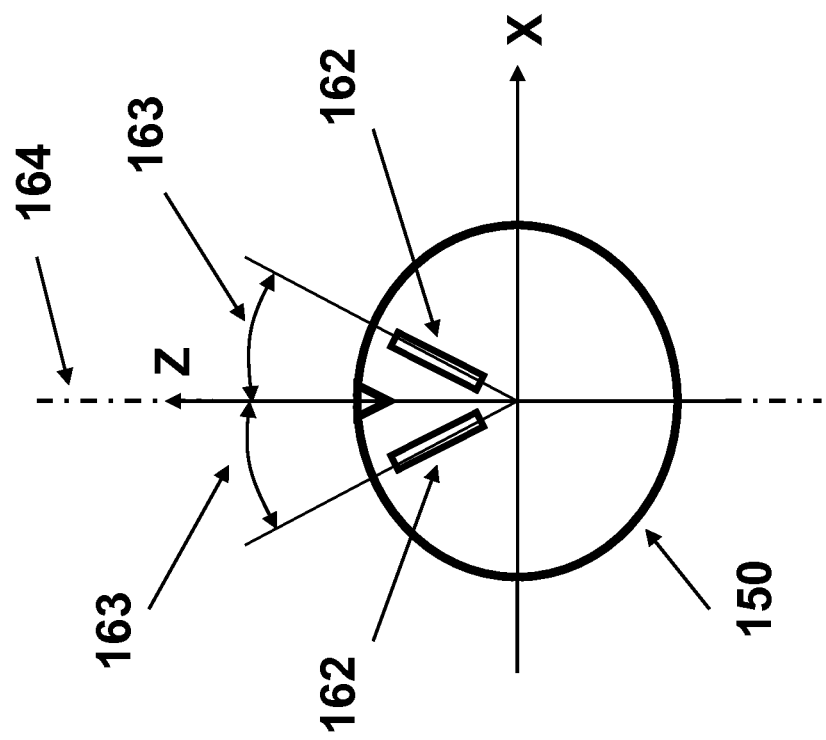

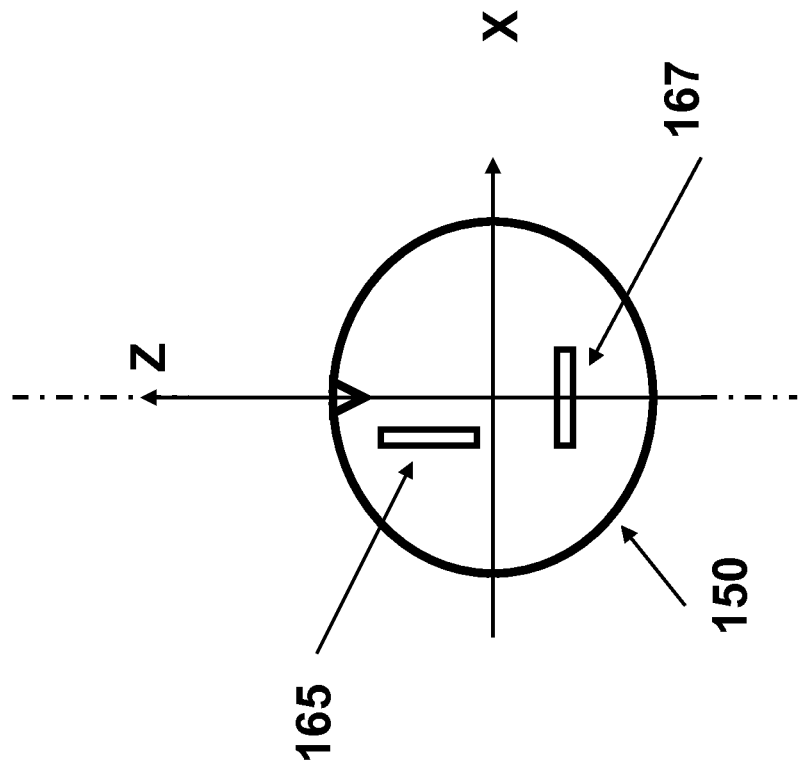
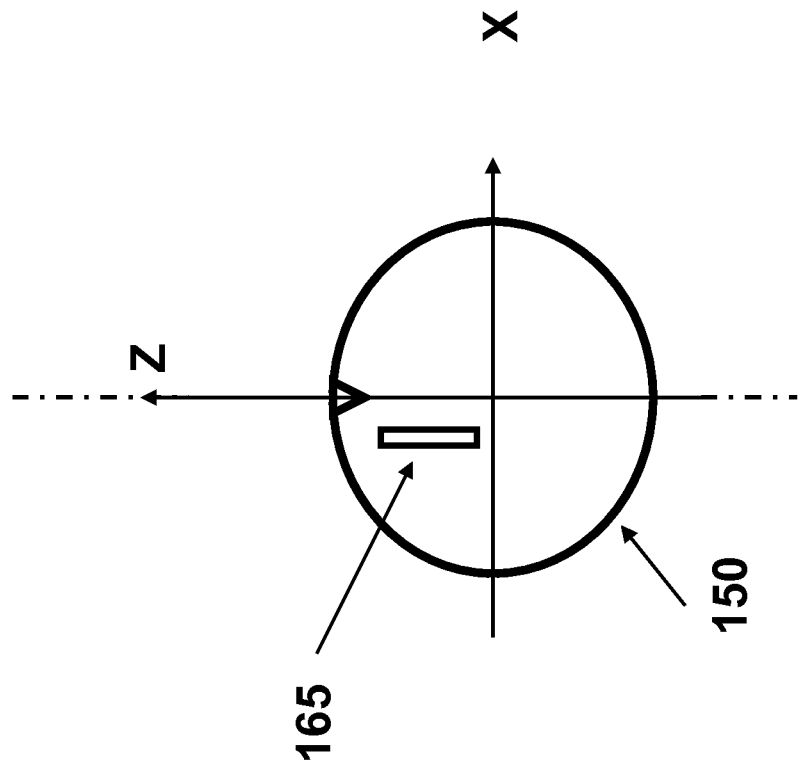

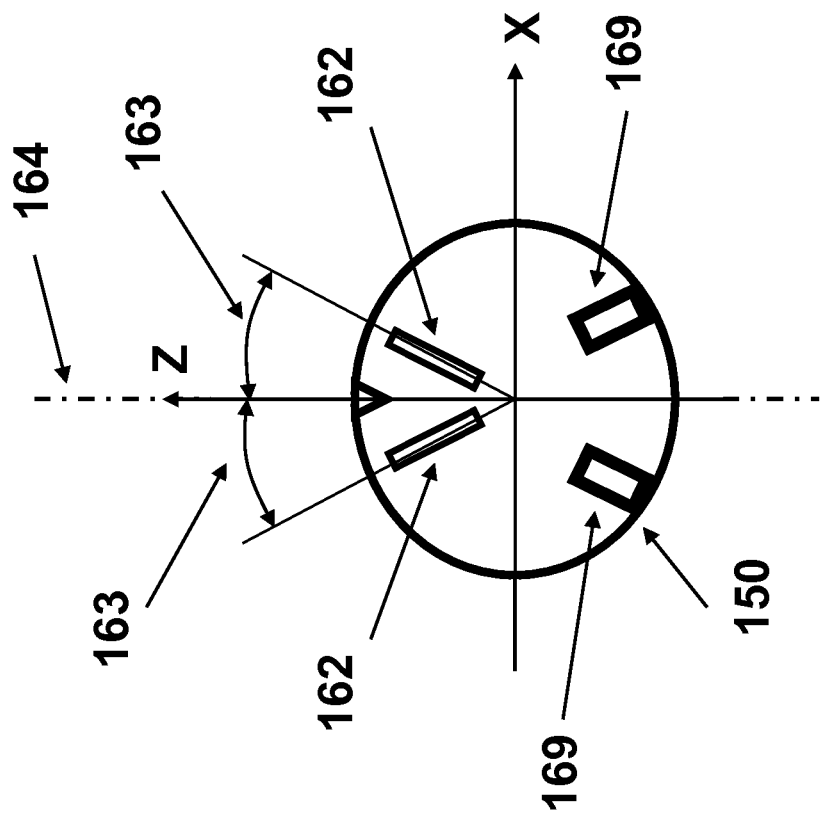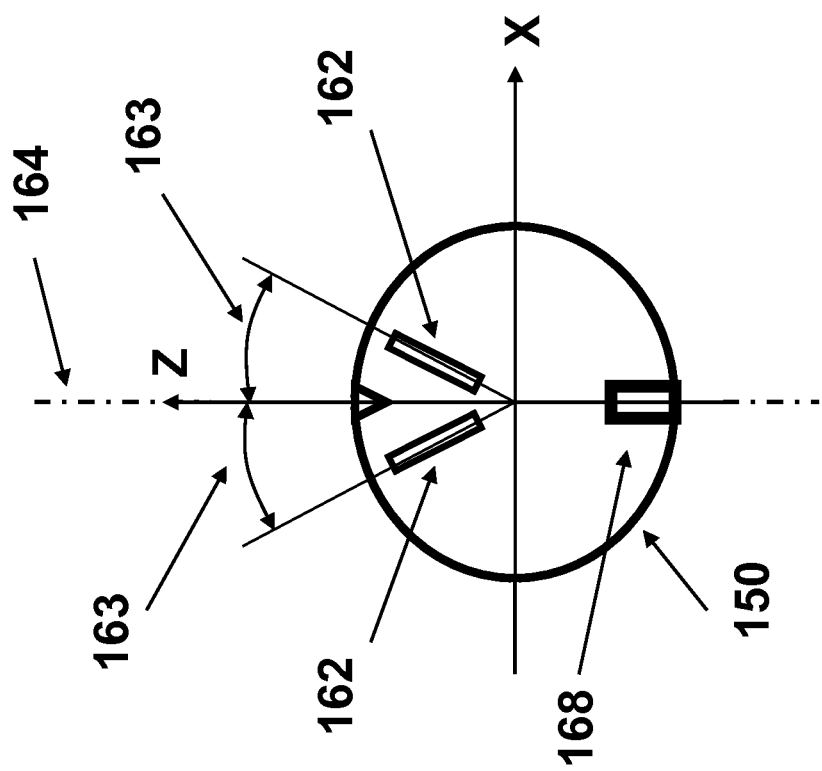

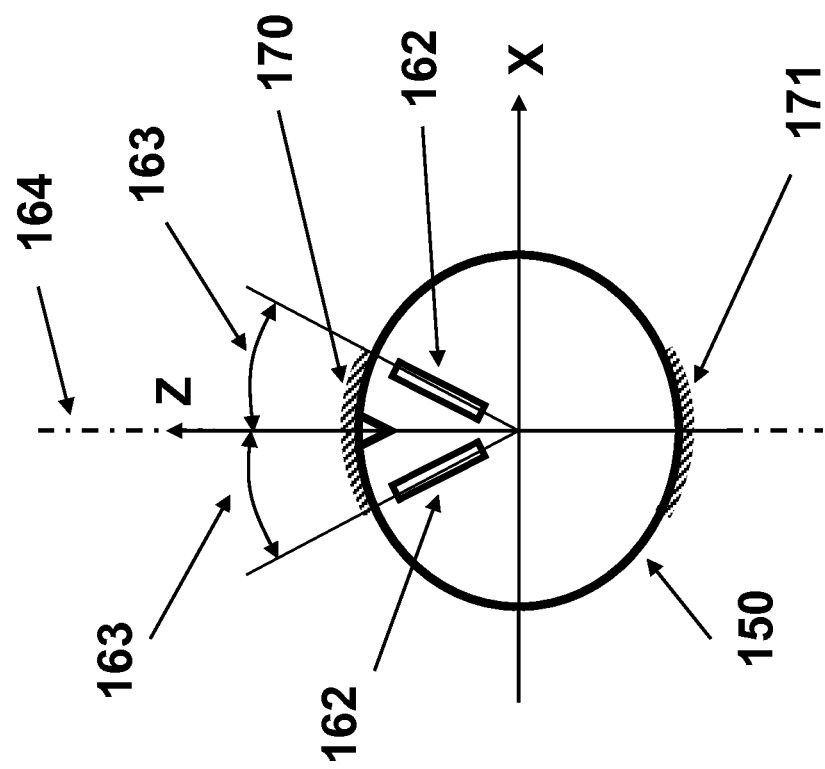

SYSTEM AND METHOD FOR ROLL ANGLE INDICATION AND MEASUREMENT IN FLYING OBJECTS

CROSS-REFERENCE TO RELATED APPLICATIONS

This application is a continuation application of U.S. application Ser. No. 12/623,432 filed on Nov. 22, 2009, now U.S. Pat. No. 8,258,999, which is a continuation-in-part of U.S. application Ser. No. 12/395,758 filed on Mar. 2, 2009, now U.S. Pat. No. 7,977,613, the entire contents of which is incorporated herein by reference.

FIELD OF THE INVENTION

The present invention relates to sensors and systems designed to indicate if an object is directed up or down relative to the vertical direction on earth (i.e., in the direction of gravity) and its deviation from the vertical direction for guidance and control purposes, in particular to sensors that a flying object can use to roll to a desired roll angle relative to the vertical plane.

BACKGROUND OF THE INVENTION

For guidance and/or steering purposes, all manned and unmanned mobile platforms, such as land vehicles, powered airborne platforms such as aircrafts and rockets, and non-powered airborne platforms such as gun-fired munitions and mortars, require onboard information as to their absolute position and orientation (usually relative to the earth) or their position and orientation relative to another object such as a reference platform or a target object.

In certain cases, the onboard position and certain orientation information (absolute or relative to the target, a reference station, another mobile platform, etc.) can be provided by an outside source, for example, by GPS for position or by a radar reading or optical signal that is reflected off some target or received by the mobile platform. In other cases, it is either required or is highly desirable to have autonomous sensors on board the mobile platform, including gun-fired projectiles, mortars and missiles, to directly measure the position and orientation of the object with respect to earth or some fixed object (for example a ground station) or a moving object (for example a moving target).

It is noted that even though in this disclosure all references are made to moving platforms, it will be appreciated by those of ordinary skill in the art that the provided description also includes the measurement of the position and orientation of one object relative to another object, one or both of which may be fixed to a third object such as the ground.

Currently available sensors that could make partial or full measurement of the position and/or orientation of an object relative to earth or another object (reference system) can be generally divided into the following classes of sensors.

One class of position and angular orientation sensors operates using optical methods. Such sensory systems can directly measure angular position of one object relative to another. However, optical based angular position sensory systems suffer from several disadvantages, including operation only in the line of sight between the two objects; accurate measurement of relative angular orientation only if the objects are relatively close to each other; limited range of angular orientation measurement; relatively high power requirement for operation; requirement of relatively clean environment to operate; and in military applications the possibility of exposing the site to enemy and jamming. Optical gyros do not have most of the above shortcomings but are relatively large, require a considerable amount of power, and are difficult to harden for high G firing accelerations. Optical methods such as tracking of projectiles with surface mounted reflectors and the like have also been developed, which are extremely cumbersome to use even during verification testing, suffer from all the aforementioned shortcomings, and are impractical for fielded munitions. In addition, the information about the object orientation can usually be determined only at the ground station and has to be transmitted to the moving object for guidance and control purposes. As a result, optical angular position sensors are generally not suitable for munitions and other similar applications.

Another class of angular orientation sensors is magnetometers that can be used to measure orientation relative to the magnetic field of the earth. The main problem with magnetometers is that they cannot measure orientation of the object about the magnetic field of the earth. Other important issues are low sensitivity; requirement of an accurate map of the magnetic field in the area of operation; and sensitivity to the presence of vehicles and the like in the area, the configuration of which usually varies in time, particularly in an active war theatre.

Another class of position and angular orientation measurement systems is based on the use of radio frequency (RF) antennas printed or placed on the surface of an object to reflect RF energy emanating from a ground-based radar system. The reflected energy is then used to track the object on the way to its destination. With two moving objects, the radar measures the time difference between the return signals from each of the objects and thereby determines angular information in terms of the angle that the relative velocity vector makes with respect to a coordinate system fixed to one of the objects. With such systems, measurement of full spatial orientation of an object (relative to the fixed radar or a second object) is very difficult. In addition, the information about the object orientation is determined at the radar station and has to be transmitted back to the moving object(s) if it is to be used for course correction. It is also very difficult and costly to develop systems that could track multiple projectiles. It is noted that numerous variations of the above methods and devices have been devised with all suffering from similar shortcomings.

In addition to the above angular orientation measurement sensors, GPS is often used to provide position information in the horizontal plane (i.e., orthogonal to the direction of gravity) and direction of the object travel. The GPS, however, does not provide altitude and angular orientation information. In the particular case of munitions, the use of GPS alone has a number of significant shortcomings, particularly for munitions applications in general and gun fired munitions, mortars and rockets in particular. These include the fact that GPS signals may not be available along the full path of the flight, and the measurements cannot be made updated fast enough to make them suitable for guidance and control purposes.

Another class of position and angular orientation sensors is based on utilizing polarized Radio Frequency (RF) reference sources and mechanical cavities as described in U.S. Pat. Nos. 6,724,341 and 7,193,556 and 7,425,998 and U.S. patent application Ser. No. 12/189,183 filed on Aug. 10, 2008, now abandoned, the entire disclosures of each of which are incorporated herein by reference, and hereinafter are referred to as "polarized RF angular orientation sensors". These angular orientation sensors use highly directional mechanical cavities that are very sensitive to the orientation of the sensor relative to the reference source due to the cross-polarization and due to the geometry of the cavity. The reference source may be fixed on the ground or may be another mobile platform (object). Being based on RF carrier signals, the sensors provide a longer range of operation. The sensors can also work in and out of line of sight. In addition, the sensors make angular orientation measurements directly and would therefore not accumulate measurement error. The sensor waveguides receive and record the electromagnetic energy emitted by one or more polarized RF sources. The angular position of a waveguide relative to the reference source is indicated by the energy level that it receives. A system equipped with multiple such waveguides can then be used to form a full spatial orientation sensor. In addition, by providing more than one reference source, full spatial position of the munitions can also be measured onboard the munitions. These angular orientation sensors are autonomous, i.e., they do not acquire sensory information through communication with a ground, airborne or the like source. The sensors are relatively small and can be readily embedded into the structure of most mobile platforms including munitions without affecting their structural integrity. As a result, such sensors are inherently shock, vibration and high G acceleration hardened. A considerable volume is thereby saved for use for other gear and added payload. In addition, the sensors become capable of withstanding environmental conditions such as moisture, water, heat and the like, even the harsh environment experienced by munitions during firing. In addition, the sensors require a minimal amount of onboard power to operate.

Currently available sensors for remote measurement of the angular orientation of an object relative to the earth or another object (target or weapon platform) rely mostly on inertia-based sensors. This class of sensors measure changes in the angular position using inertial devices such as accelerometers and gyros. Inertial based angular orientation sensors, however, generally suffer from drift and noise error accumulation problems. In such sensors, the drift and the measurement errors are accumulated over time since the acceleration has to be integrated to determine the angular position. As a result, the error in the angular position measurement increases over time. In addition, the initial angular orientation and angular velocity of the object must be known accurately. Another shortcoming of inertia based angular position sensors is that the position and angular orientation of one object relative to another cannot be measured directly, i.e., the orientation of each object relative to the inertia frame has to be measured separately and used to determine their relative angular orientation. As a result, errors in both measurements are included in the relative angular orientation measurement, thereby increasing the error even further. In addition, electrical energy has to be spent during the entire time to continuously make such sensory information.

In the particular case of gun-fired munitions, to achieve the required guidance and control accuracy over relatively long distances and related times, the position and angular orientation of the projectile has to be known during the entire time of the flight with high precision. The firing acceleration, however, would saturate the inertial devices and require relatively long periods of time to settle. As a result, such sensors need to be initialized often, particularly for their initial position and orientation following firing and settling of the inertial devices. For longer range weapons and to further increase precision, the inertial devices may also have to be initialized regularly during the flight.

For initialization of position in the horizontal plane and heading (direction of path of travel of the projectile—which would generally indicate the mean angular orientation of the projectile in the horizontal plane for stable flights), the GPS may be used when available or when necessary for guidance purposes towards a target. However, other means have to be used to determine the altitude and angular orientation in the vertical plane, and in particular the roll angle of the projectile, i.e., its angular orientation about its long axis (which is usually close but not always coincident to the tangent to path of travel of the center of mass of the projectile).

The elevation and projectile orientation in the vertical plane is important if the projectile is not equipped with homing sensors. If the projectile is equipped with homing sensors, then the altitude and orientation in the vertical plane are not necessary for guidance of the projectile towards the target once the target is identified by the homing device. However, the roll angle is of particular importance since it has to be known for proper operation of guidance and control system, i.e., for proper operation of the control surfaces of the projectile such as fins, canards, or other available control surfaces and/or thrusters used for guiding the projectile towards the target indicated by the homing sensors. In addition, gyros or accelerometers employed by inertia devices to measure roll angle (rate of angular rotation or angular acceleration in roll) still need to be initialized following launch and settling of the inertia device and sometimes later during the flight, depending on the flight time and the drift rate of the inertia devices.

A need therefore exists for methods and apparatus for sensors that can be used onboard a flying object such as gun-fired munitions, mortar or rocket to roll the object to a desired roll angle relative to the vertical plane or any other plane of reference. The sensors can provide a real-time measure of the deviation of the object in roll from the desired roll angle, so that the measured deviation can be used by the control system onboard the object to roll it to the said desired roll angle.

The aforementioned roll position indication sensors can be autonomous, capable of being mounted or embedded into various moving platforms, in particular, in various gun-fired munitions and mortars and rockets. The roll position indication sensors can be low cost, capable of being used in guided direct- and indirect-fire munitions, and be small enough to be reliably integrated into small- and medium-caliber munitions as well as long-range munitions.

The disclosed sensors provide a real-time measure of the deviation of the object in roll from the desired roll angle positioning so that the measured deviation can be used by the control system onboard the object to roll it to the desired roll angle. The measured deviation is the difference between the amplitude of the signal received at two symmetrically positioned sensors about a plane of polarization which is used to indicate the desired roll angle positioning of the object. One advantage of this method is that the magnitude of the signal received at each individual sensor does not have to be correlated to the object roll angle since when the two sensors are oriented symmetrically with respect to the plane or polarization, i.e., when the object is oriented in the desired roll angle, the two sensors receive the same signal and the difference between their received signal becomes zero (within the acceptable tolerances). In addition, both sensors are similarly affected by environmental and other noise levels, therefore the effects of the noise in the received signal is minimized.

The disclosed sensors cannot however be used to measure roll angle positioning of the object or similarly bring the object to an arbitrary roll angle positioning without similarly rotating the plane of polarization of the reference source. In certain applications, the object in flight operates about a nearly fixed/desired roll angular positioning, such as most UAVs and many guided munitions. In other applications, the projectile may be flying with roll angles that are not actively controlled (such as in spinning projectiles), and therefore to effectively guide the projectile towards the target, the projectile controller needs to know the roll angle positioning of the projectile at all times.

A need therefore exists for roll angle measuring sensors to address the roll angle measurement requirements for the latter applications.

SUMMARY OF THE INVENTION

Accordingly, a method for onboard determination of a roll angle of a projectile is provided. The method comprising: transmitting a polarized RF signal from a reference source, with a predetermined polarization plane; receiving the signal at a pair of polarized RF sensor cavities positioned symmetrical on the projectile with respect to a reference roll position on the projectile; measuring a difference between an output of the pair of polarized RF sensor cavities resulting from the received signal to determine zero output roll positions of the projectile; and comparing an output of the pair of polarized RF sensor cavities at each of the zero output positions to determine when the projectile is parallel to the predetermined polarization plane.

The predetermined polarization plane can be vertical.

The method can further comprise analyzing an output of at least one third sensor positioned on the projectile to determine whether the roll angle position of the projectile is up as compared to the horizon. The method can further comprise controlling the projectile based on the determined roll angle positioning. The third sensor can be selected from a group consisting of a gravity switch, inclinometer, GPS receiver, and another polarized RF reference source.

The method can further comprise configuring the pair of polarized RF sensor cavities such that the output can further be used to determine a pitch of the projectile relative to a longitudinal axis of the projectile.

Also provided is a projectile comprising: a casing; a pair of polarized RF sensor cavities positioned symmetrically on the casing with respect to a predetermined polarization plane; and a processor configured to: measure a difference between an output of the pair of polarized RF sensor cavities resulting from the received signal to determine zero output roll positions of the projectile; and compare an output of the pair of polarized RF sensor cavities at each of the zero output positions to determine when the projectile is parallel to the predetermined polarization plane.

The projectile can further comprise at least one third sensor positioned on the projectile and the processor is further configured to analyze an output of the at least one third sensor to determine whether the roll angle position of the projectile is up as compared to the horizon. The projectile can further comprise a guidance and control system under the control of the processor for controlling the projectile based on the determined roll angle positioning. The third sensor can be selected from a group consisting of a gravity switch, inclinometer, GPS receiver, and another polarized RF reference source.

The pair of polarized RF sensor cavities can be configured such that the output can further be used to determine a pitch of the projectile relative to a longitudinal axis of the projectile.

Still further provided is a method for onboard determination of a roll angle of a projectile. The method comprising: transmitting a polarized RF signal from a reference source, with a predetermined polarization plane; receiving the signal at two polarized RF sensor cavities positioned orthogonally with respect to each other on the projectile and with respect to a reference roll position on the projectile; and determining when the projectile is parallel to the predetermined polarization plane based on an output of the two polarized RF sensor cavities.

BRIEF DESCRIPTION OF THE DRAWINGS

These and other features, aspects, and advantages of the apparatus and methods of the present invention will become better understood with regard to the following description, appended claims, and accompanying drawings where:

FIGS. 3 and 3a are illustrations of coordinate systems that can be used to indicate the orientation of an object in flight (in this case a munition) relative to a fixed object (in this case the polarized RF reference source). In this illustration, the orientation is described by the pitch, yaw and roll, customarily used for munitions in flight.

FIG. 4 is an illustration of the view of the back surface of a typical projectile, such as a gun-fired projectile, mortar or rocket, indicating the projectile-fixed Cartesian coordinate system XYZ and a marker indicating the assumed zero roll angle positioning of the projectile.

FIGS. 5a and 5b illustrate the view of the FIG. 4 of the projectile at two roll angle positions of the projectile, respectively, with 180 degrees difference.

FIGS. 6a and 6b illustrate the positioning of two identical polarized RF cavity sensors on the back of the typical projectile of FIG. 4 in the radial direction and symmetric about the YZ plane of the projectile.

FIGS. 6c and 6d illustrate the positioning of two identical polarized RF cavity sensors on the back of the typical projectile of FIG. 4 in parallel with each other and symmetric about the YZ plane of the projectile. A third similar polarized RF cavity sensor is shown in FIG. 6d to be positioned perpendicular to the YZ plane, i.e., parallel to the XY plane.

FIG. 7a illustrates the use of a gravity switch in the up-down indiscriminating embodiment of FIG. 6a to obtain an up-down discriminating embodiment.

FIG. 7b illustrates an alternative embodiment to that illustrated in FIG. 7a with two tilted gravity switches.

FIG. 8 is an illustration of an autonomous onboard absolute position and orientation measurement system (sensor) of a second embodiment.

FIG. 12 illustrates a variation of the up-down discriminating embodiment of FIG. 7a.

DETAILED DESCRIPTION OF PREFERRED EMBODIMENTS

Figure 1:
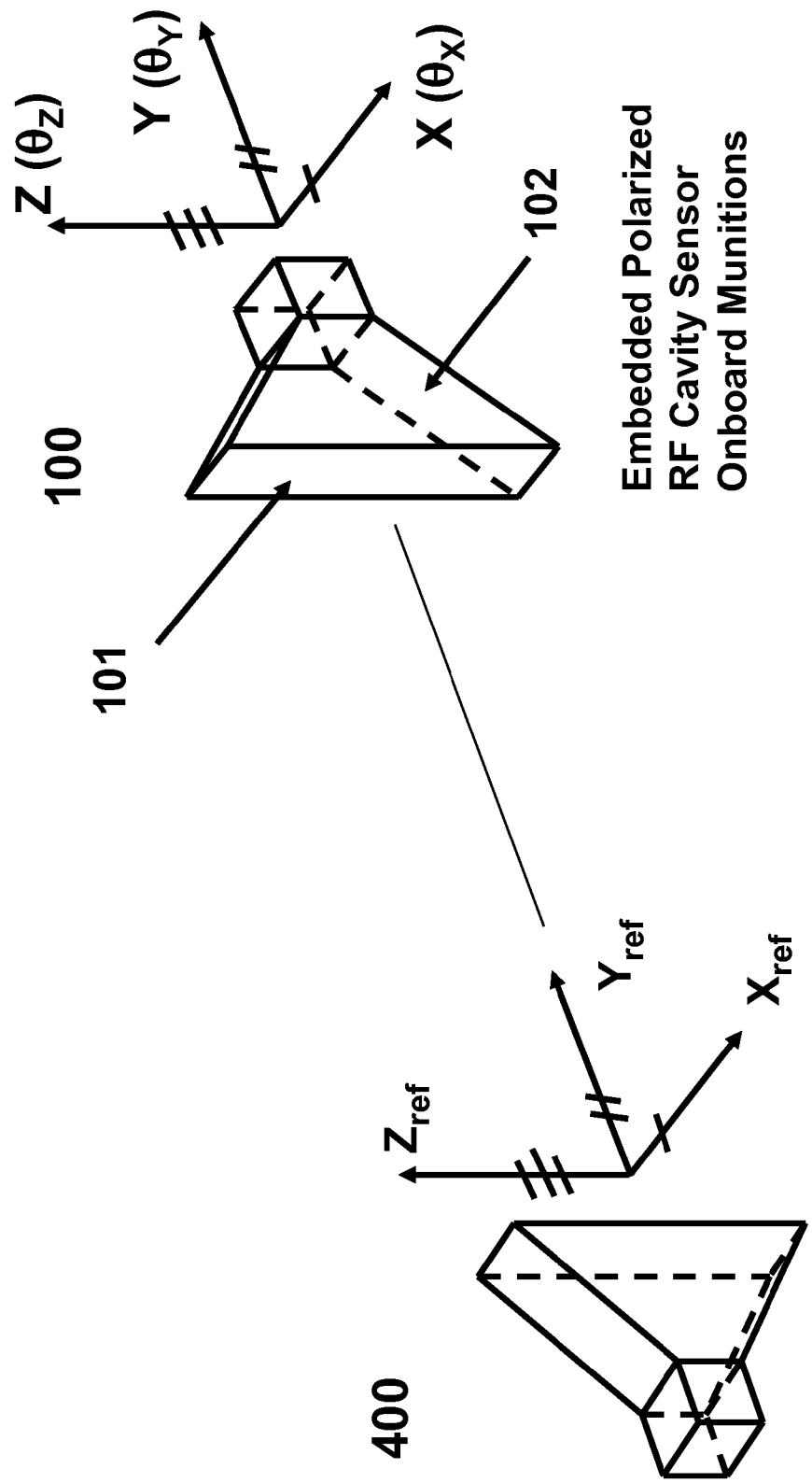
FIG. 1 represent a view of a polarized RF reference source and a polarized RF cavity sensor positioned far-field from the polarized RF reference source.
Figure 2:
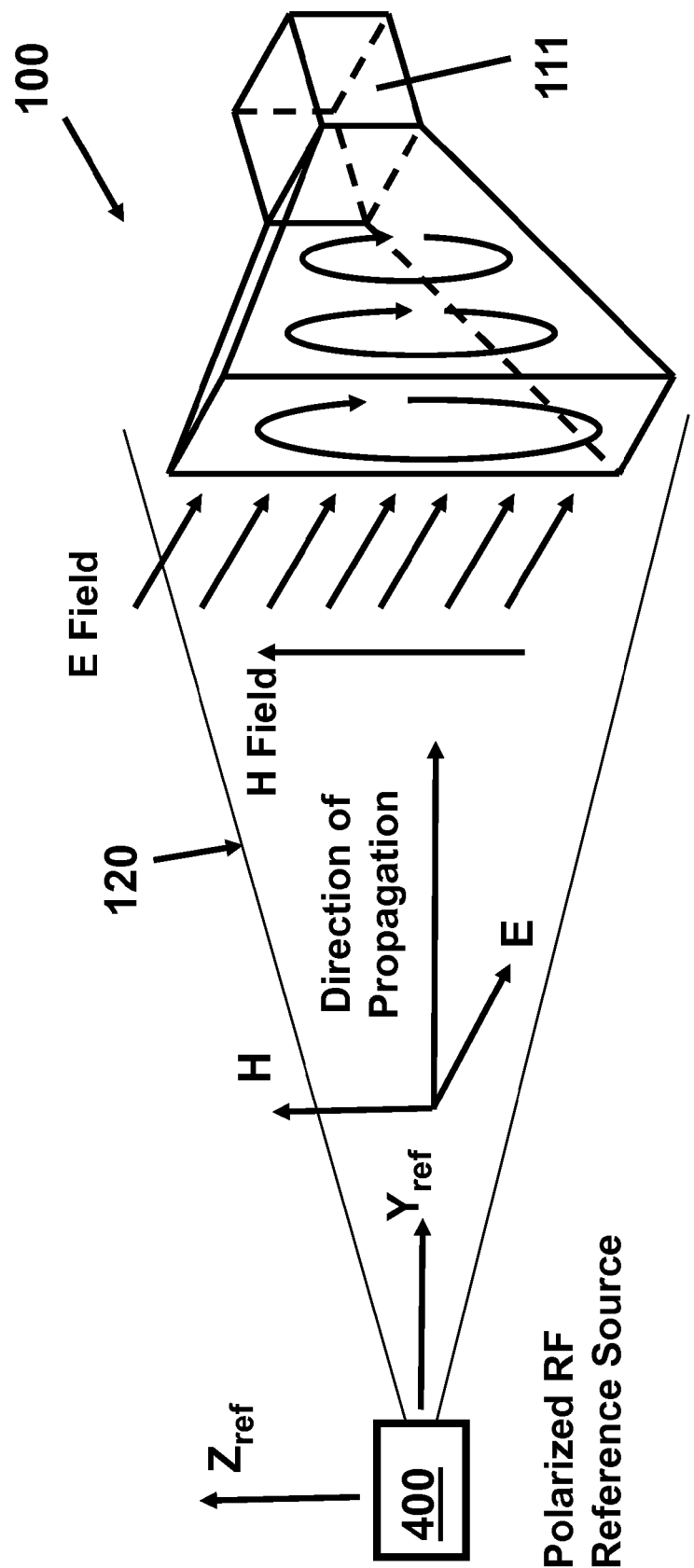
FIG. 2 illustrates the propagation of the polarized RF electromagnetic field from the polarized RF reference source and as received by the polarized RF cavity sensor of FIG. 1.

Referring now to FIGS. 1 and 2 there is shown a representation of the polarized radio frequency (RF) cavity sensor 100 and its operation with respect to a polarized RF reference (illumination) source (illuminator) 400 affixed to a ground control station or to a (ground or airborne or space) mobile platform.

An electromagnetic wave 120 consists of orthogonal electric (E) and magnetic (H) fields. The electric field E and the magnetic field H of the illumination beam of the illuminating source 400 are mutually orthogonal to the direction of propagation of the illumination beam. In the case of the polarized RF reference (illumination) source 400, the planes of E and H fields are fixed and stay unchanged in the direction of propagation. Thus, the polarized RF reference source 400 establishes a coordinate reference system with known and fixed orientation and a polarization with a known plane of reference. The polarized RF cavity sensor 100 reacts in a predictable manner to a polarized illumination beam and the magnitude of the signal received by the sensor 100 is a function of the distance between the polarized RF reference source 400 and the polarized RF cavity sensor 100 and the orientation of the sensor 100 relative to the reference source 400.

Hereinafter in this disclosure, for the sake of simplicity and consistency, and since the polarized RF cavity sensors 100 are generally intended to be embedded in the structure of the object utilizing the sensor, for example in the structure of a gun-fired munitions or mortar or rocket, only the cavity opening 101 (FIG. 1) will be shown in most illustrations. For this purpose, typical sectoral horn geometries (FIGS. 1 and 2) will be used without any intention of restricting the spirit or scope of the present invention to such geometries. In addition, the frontal (rectangular) geometry of the opening 101 will be used to indicate the orientation of the cavity opening. In addition, hereinafter and for the sake of consistency, the longer side of the frontal rectangle (directed in the direction of the H field in FIG. 2 for maximum received signal amplitude) will be used to indicate the orientation of the present polarized RF cavity sensors. It is, however, noted that the disclosed embodiments are not intended to be restricted to sectoral horn type polarized RF sensor cavities and in fact, the geometry of such sensor cavities are preferably optimized for maximum sensitivity for each particular application. In addition, hereinafter, when a polarized RF sensor cavity is said to be parallel to a certain plane, it is meant that the side surfaces are essentially parallel to the said plane.

In FIG. 1, the Cartesian (reference) coordinate system $X_{ref}Y_{ref}Z_{ref}$ is considered to be fixed to the polarized RF reference source 400 and the coordinates coordinate system XYZ is considered to be fixed to the polarized RF cavity sensor 100 with the angles $\theta_x$, $\theta_y$ and $\theta_z$ indicating the rotation of the polarized RF cavity sensor 100 about the axes X, Y and Z, respectively. In the remainder of this disclosure and for the sake of simplicity only and without limiting the application of the disclosed methods and apparatus, the plane of polarization of the polarized RF reference source 400 is considered to be parallel to the $Y_{ref}Z_{ref}$ plane of the $X_{ref}Y_{ref}Z_{ref}$ coordinate system. The polarized RF cavity sensor 100 is also considered to be always in the far-field of the polarized RF reference source 400.

With more specific reference to FIG. 1, the polarization mismatch between the polarized RF reference (illuminating) source 400 and the polarized RF cavity sensor (sectoral horn type cavity shown in FIGS. 1 and 2) is caused by a variation in the angle $\theta_y$, FIG. 1. At a given positioning of the polarized RF cavity sensor 100 relative to the polarized RF reference source 400, the amplitude of the signal received by the cavity sensor 100 is also a function of the sensor 100 angular orientations indicated by $\theta_x$ and $\theta_z$. For a sectoral horn cavity type polarized RF sensor 100 shown in FIGS. 1 and 2, the amplitude of the signal received is usually most sensitive to rotations $\theta_x$ and least sensitive to rotation $\theta_z$.

For a given polarized RF cavity sensor 100 and a polarized RF reference source 400, the relationships between the signal received at the sensor 100 as a function of the angles $\theta_x$, $\theta_y$, and $\theta_z$ can be described as follows. It is well known that for an arbitrary pair of transmit and receive antennas, such as the polarized RF reference source 400 and the polarized RF cavity receiver antenna (sensor) 100, in free-space, the power received at the receiver 100 is given by the so-called Friis transmission equation. For a given position of the cavity sensor 100 relative to the reference source 400, this transmission equation can be written as:

$$P_r = P_t(\lambda/4\pi R)^2 G_{tot} G_g(\theta_X, \theta_Z) |\rho_t^* \rho_r|^2 \qquad (1)$$

where $P_t$ and $P_r$ are the transmitted and received powers, respectively; $\lambda$ is the wavelength and R is the radial distance between the transmitter and receiver; $\rho_t$ and $\rho_r$ are the polarization unit vectors of the transmitter and receiver, respectively; $G_{tot}$ is the total gain corresponding to factors other than spatial orientation of the receiver relative to the illuminating source; and for a given cavity geometry, $G_g$ is a function of the angular orientation of the cavity sensor indicated by the angles $\theta_x$ and $\theta_z$, and is related to the geometrical design of the cavity. For most practical antennas, the gains $G_{tot}$ and $G_g$ are complicated functions of antenna geometry, size, material properties and polarization. In general, these functions have to be theoretically evaluated or measured in an anechoic chamber. While closed-form analytical expressions for some canonically shaped antennas, for other antenna types one needs to resort to numerical techniques such as Method of Moments (MOM), Finite-Difference Time Domain Method (FDTD), or Finite Element Method (FEM), all of which are well known in the art.

For a given geometrical cavity sensor (antenna) 100 positioned at a fixed distance from a polarized RF reference source 400, the sensor output power (received at the pick up terminals commonly used and located in the back of the cavity 111 in FIG. 2—not shown) as a function of the angular orientations described by angles $\theta_x$, $\theta_y$ and $\theta_z$ may readily be measured in an anechoic chamber. For a given position and orientation measurement application, such measurements can be made for the full range of spatial rotation of the polarized RF cavity sensor 100 and the information can be stored in tabular or graphical or any other appropriate form. This information serves as calibration data for each polarized RF cavity sensor 100.

FIG. 3 is an illustration of a coordinate system XYZ (indicated also with the numeral 131) fixed to the object in flight 132 (in this case a gun-fired projectile, mortar or rocket). A polarized RF reference source 140 (similar to the reference source 400 in FIG. 1) is considered to be positioned (usually fixed to the ground at or near the firing platform, but may also be fixed to a moving platform). The (reference) coordinate system $X_{ref}Y_{ref}Z_{ref}$ (also indicated by the numeral 141) is similarly considered to be fixed to the polarized RF reference source 140. In the coordinate system 131, the orientation of the object in flight 132 relative to the fixed coordinates 141 is described by the pitch ($\theta_x$), and roll ($\theta_y$) and yaw ($\theta_z$), also indicated by the numerals 133, 134 and 135, as customarily used for objects, such as munitions, in flight.

In FIG. 3a, the close-up view of the tail end of the projectile is shown in the circle 136, the frontal view of which as seen in the direction of the arrow 137 is shown in FIG. 4 (the fins are not shown for clarity). In the view 137 shown in FIG. 4, the projectile base 150 is seen with the projectile fixed XYZ coordinate system (see FIG. 3). It is noted that the coordinate Y is perpendicular to the plane X (152)-Z (153), which seen in this view 137 and is directed into the plane of the view. The rotation $\theta_Y$ of the projectile about Y axis, indicated by the arrow 151, indicates the rolling rotation of the projectile. In this and the following descriptions and illustrations, when the axis Z (the plane YZ) of the projectile is vertical relative to the earth (as intended to be indicated in FIG. 4), the roll angle of the projectile is considered to be zero. In the following descriptions, a point on the projectile base 150 indicated by the tip of the triangle 154 is intended to indicate the roll angle of the projectile, with zero roll being considered to be when the plane YZ of the projectile is vertical relative to earth as shown in FIG. 4.

As previously indicated, the methods and apparatus disclosed herein can be used onboard a flying object such as the projectile shown in FIGS. 3 and 4 to provide a measure of deviation of the projectile in roll from a desired roll positioning from the vertical (relative to earth) plane. For the case of a typical projectile 132 (FIG. 3), this would mean that the desired roll positioning of the projectile relative to the vertical plane can be indicated by the angle 160 that the Z axis makes with the vertical direction 161 as shown in FIGS. 5a and 5b. It is noted that in both configurations of FIGS. 5a and 5b, the plane YZ has the same angular orientation as indicated by the angle 160 with the vertical plane 161. However, in FIG. 5b the roll angle is 180 degrees larger than that of FIG. 5a (noting that when the marking pointer 154 is up, i.e., when the YZ plane is vertical as shown in FIG. 4, the roll angle is considered to be zero—and for the sake of convenience, the clockwise rotation of the projectile as seen in the views 137 in FIG. 4 is considered to indicate positive roll rotation).

In certain applications, it is only required that the plane YZ be oriented in roll an angle 160, irrespective whether the Z axis (marking pointer 154) is pointing up (FIG. 5a) or pointing down (FIG. 5b). In certain other applications, one of the above configurations (FIG. 5a or FIG. 5b) is desired to be achieved. The following embodiments address both of the above requirements.

Hereinafter, for the sake of simplicity and without applying any restriction, the desired roll angle 160 in FIGS. 5a and 5b are considered to be zero or 180 degrees. In addition, when the YZ plane is vertical and the marking pointer 154 is on the top as shown in FIG. 4, then the projectile is considered to be at a zero roll angle. On the other hand, when the YZ plane is vertical and the marking pointer 154 is on the bottom (opposite to that shown in FIG. 4), then the projectile is considered to be at a 180 degrees of roll angle.

One embodiment is shown schematically in FIG. 6a. The illustration shows the frontal view 137 of FIG. 4, with the YZ plane of the projectile 150 being oriented in the vertical direction indicated by the orientation of the line 164. Two identical polarized RF cavity sensors 162 are positioned at equal angles 163 (symmetrically) relative to the YZ plane. Then during the flight, FIG. 3, the magnitude of the signal received by the two RF polarized cavity sensors 162 from the polarized RF reference source 140 will be the same and indicate that the projectile is either at zero roll angles (YZ plane vertical as shown in FIG. 6a), or at 180 degrees roll angle (YZ plane still vertical but the marking pointer 154, i.e., the Z axis, pointing downwards), or at 90 degrees roll angle (YZ plane horizontal as shown in FIG. 6b, or at 270 degrees roll angle (YZ plane still horizontal but the marking pointer 154, i.e., the Z axis, pointing to the left). Onboard the projectiles, the magnitude of the signal received by the two polarized RF cavity sensors 162 can be compared and if substantially equal (accounting for extraneous effects such as manufacturing, assembly or calibration errors or environmental noise or instrumentation errors, etc., that are usually present), then the projectile is determined to be at one of the above four roll angular positions. In practice, the difference between the outputs of the two polarized RF cavity sensors 162 (hereinafter, referred to as the differential output of the two polarized RF cavity sensors) is preferably measured (preferably directly by onboard electronics) and used as a measure of the deviation of the projectile in roll from one of its above four zero differential sensor output positioning, i.e., from either one of the roll angle positions of zero, 90, 180 or 270 degrees.

In general, it is desirable to be able to simply differentiate the zero and 180 degrees roll angle positioning of the projectile from its 90 and 270 degrees roll angle positioning. In one embodiment, the polarized RF cavity sensors 162 are oriented at relatively small angles 163 (less than 45 degrees and more than zero, preferably not less than 30 degrees) relative to the YZ plane. As a result, since the plane of polarization of the polarized RF reference source is parallel to the vertical plane, the magnitude of signal received by the two polarized RF cavity sensors 162 at 90 and 270 degrees roll angle positioning of the projectile becomes significantly smaller than the magnitudes of the signal received by the cavity sensors 162 in the zero and 180 degrees roll angle positioning of the projectile, and thereby provides the means to differentiate between the zero (or 180) degrees roll angle positioning and the 90 (or 180) degrees roll angle positioning of the projectile. The projectile guidance and control system can then used the difference between the signals received at the two polarized RF cavity sensors 162 to roll the projectile to its zero (or 180) degrees roll angle positioning and when desired to initialize onboard inertia sensors (specifically in roll) or initiate other guidance and control actions.

In another embodiment, one polarized RF cavity sensor is positioned parallel to the Z axis (i.e., the YZ plane) as shown in FIG. 6c and indicated by numeral 165. As a result, since the plane of polarization of the polarized RF reference source is parallel to the vertical plane, the magnitude of signal received by the polarized RF cavity sensor 165 at 90 and 270 degrees roll angle positioning of the projectile becomes zero, while the magnitude of signal receive becoming maximum at zero and 180 degrees roll angle positioning of the projectile, thereby providing the means to differentiate between the zero (or 180) degrees roll angle positioning and the 90 (or 180) degrees roll angle positioning of the projectile. The projectile guidance and control system can then use the magnitude of the signal received at the polarized RF cavity sensor 165 to roll the projectile to its zero (or 180) degrees roll angle positioning or if desired to 90 or 270 degrees roll angle positioning of the projectile.

In FIGS. 6a and 6b the pairs of polarized RF cavity sensors 162 are shown to be positioned above the X axis (i.e., above the XY plane). However, it is appreciated by those familiar with the art that the said pairs of polarized RF cavity sensors could be similarly positioned symmetrically about any plane that is parallel to the YZ plane and anywhere above or below or on the XY plane. Similarly, the polarized RF cavity sensor 165 in FIG. 6c may be positioned anywhere as long as it is positioned parallel to the YZ plane.

In yet another embodiment, a similar polarized RF cavity sensor 167 which is positioned parallel to the plane XY is added to the embodiments shown in FIG. 6a, 6b or 6c, as shown in FIG. 6d for the case of the embodiment shown in FIG. 6c. It is then observed that when the projectile is at zero or 180 degrees roll angle positioning, i.e., when the plane YZ is oriented vertically and parallel to the plane of polarization of the polarized RF reference source 400 (FIG. 1), then the polarized RF cavity sensor 167 is oriented perpendicular to the plane of polarization, and therefore has an essentially zero output signal amplitude. As a result, onboard monitoring of the output of the polarized RF cavity sensor 167 and the differential output of the two polarized RF reference sources 162 in FIGS. 6a and 6b provide the means to determine if the projectile is in the zero or 180 degrees roll positioning, and if not, the projectile guidance and control system can use the differential output of the two polarized RF reference sources 162 in FIGS. 6a and 6b to roll the projectile to its zero (or 180) degrees roll angle positioning and when desired to initialize onboard inertia sensors (specifically in roll) or initiate other guidance and control actions.

Alternatively, the aforementioned identical polarized RF cavity sensor 167 (FIG. 6d) may be positioned parallel to the Z axis (YZ plane) in the embodiment of FIG. 6a. In this configuration, then when the plane YZ is oriented vertically and parallel to the plane of polarization of the polarized RF reference source, i.e., when the roll angle of the projectile is either zero or 180 degrees, the magnitude of the signal received at the sensor 167 is larger than the individual sensors 162, thereby the onboard electronics can differentiate the zero and 180 degrees roll angle positioning of the projectile from its 90 and 270 degrees roll positioning at which roll angles the output of the sensor 167 would have been zero.

In yet another embodiment, the polarized RF cavity sensors 165 and 167 (FIG. 6d) are used. The two sensor cavities are seen in FIG. 6d to be oriented perpendicular to each other. In this arrangement, the cavity sensor 165 is parallel with the YZ plane and the cavity sensor 167 is parallel to the XY plane of the projectile-fixed Cartesian coordinate system. It is then observed that when the projectile is at zero or 180 degrees roll positioning, i.e., when the plane YZ is oriented vertically, i.e., parallel to the plane of polarization of the polarized RF reference source, then the polarized RF cavity sensor 167 is oriented perpendicular to the plane of polarization, and therefore has an essentially zero output signal amplitude, while the polarized RF cavity sensor 165 is parallel to the plane of polarization of the polarized RF reference source, thereby providing maximum output signal amplitude. As a result, onboard monitoring of the outputs of the polarized RF cavity sensors 165 and 167 would similarly provide the means to determine if the projectile is in the zero or 180 degrees roll positioning, and if not, the projectile guidance and control system can use the magnitude of the output of the polarized RF cavity sensor 167 to roll the projectile to its zero (or 180) degrees roll angle positioning (by rolling the projectile until the magnitude of the output becomes zero) or when desired to initialize onboard inertia sensors (specifically in roll) or initiate other guidance and control actions. Similarly, the magnitude of the output of the polarized RF cavity sensor can be used by the projectile guidance and control system to roll the projectile to its 90 (or 270) degrees roll angle positioning (by rolling the projectile until the magnitude of the output becomes zero).

In yet another embodiment, when the projectile is continuously spinning (rolling) about its long axis during the flight, the polarized RF cavity sensor 165 (FIG. 6c) may be used for similar roll angle position determination. In this scenario, as the projectile spins, when it comes to its zero or 180 degrees roll angle positioning, the magnitude of the sensor output is maximum, indicating the zero or 180 degrees roll angle positioning of the projectile. Such an embodiment is obviously most useful for spinning projectiles since if the projectile is not spinning, the maximum magnitude of the sensor output is difficult to predict, particularly since it is dependent on the increasing distance of the projectile to the (usually stationary) polarized RF reference source, and its slight but usually present pitch and yaw motions of the projectile. As a result, onboard monitoring of the magnitude of the polarized RF cavity sensor 165 output would similarly provide the means to determine when the projectile is its zero or 180 degrees roll positioning. The information can then be used for guidance and control purposes, e.g., for initializing onboard inertia sensors or for timing and proper actuation of control surfaces or thrusters, or the like.

It is, however, appreciated that even though the previous embodiment has the advantage of using only a single polarized RF cavity sensor, it has the shortcoming of relying on the detection of (generally unknown and varying) maximum sensor output magnitude. The shortcoming is obviously less significant for continuously spinning (with generally slowly varying spinning rates) projectiles since one could then use well known peak detection methods to filter out noise and determine zero or 180 degrees roll positioning of the projectile. The shortcoming becomes significant when the projectile is not a continuously spinning projectile, thereby the maximum magnitude of the sensor output becomes difficult to predict, particularly since it is dependent on the increasing distance of the projectile to the (usually stationary) polarized RF reference source, and its slight but usually present pitch and yaw motions of the projectile. For latter applications, the embodiment of FIGS. 6a and 6b are obviously more appropriate since they do not suffer from the aforementioned shortcoming, since the onboard electronics need only detect zero differential output magnitude measurement of the pairs of polarized RF cavity sensors 162.

Alternatively, the polarized RF cavity sensor 167 (FIG. 6d) alone is used. Then when the projectile is at zero or 180 degrees roll angle, the magnitude of the sensor output becomes zero, thereby indicating zero or 180 degrees roll angle positioning of the projectile. Such an embodiment is obviously useful for both continuously spinning and non-spinning projectiles. Such polarized RF cavity sensor can be used since zero output and zero or 180 degrees roll angle positioning correspondence is independent of the distance of the projectile to the polarized RF reference source or (usually slight but present) pitch and yaw motions of the projectile. In addition, only one polarized RF cavity sensor is required. As a result, onboard monitoring of the outputs of the polarized RF cavity sensor 167 would similarly provide the means to determine if the projectile is in the zero or 180 degrees roll positioning, and if not, the projectile guidance and control system can use the output of the polarized RF cavity sensor 167 to roll the projectile to its zero (or 180) degrees roll angle positioning and when desired to initialize onboard inertia sensors (specifically in roll) or to initiate other guidance and control actions.

In many applications, sensors are only required to indicate zero or 180 degrees roll angle positioning (i.e., vertical positioning of the YZ plane of the projectile—no matter whether the Z axis is pointing up or down) and/or provide a measure of deviation from such roll angle positioning of the projectile. In such applications, any one of the above embodiments may be used as long as size and shape of the projectile body allows their integration into the projectile. Hereinafter in this disclosure, the above embodiments are referred to as "up-down indiscriminating" embodiments. In many other applications, however, the roll angle positioning of a marking point (e.g., the roll angle 160 of the marking point 154 in FIG. 5a) needs to be differentiated from that of its roll angle positioning 180 degrees apart (shown in FIG. 5b for the case of FIG. 5a roll angle positioning). Hereinafter in this disclosure, the latter embodiments will be referred to as "up-down discriminating" embodiments. The following embodiments are provided for such applications.

In one such embodiment, a gravity switch or the like is used to differentiate up (above the horizon plane) portion of the roll angle positioning from its down (below the horizon plane) portion of the roll angle positioning. This method may be applied to any one of the aforementioned (up-down indiscriminating) embodiments.

Gravity switches are currently commercially available and are generally used to indicate if an object is pointing up (any arbitrary positioning of an object may obviously be selected to indicate its upward direction). Such gravity switches are, for example, described in U.S. Pat. Nos. 4,668,846, 4,513,183, 4,467,154, 4,427,876 and 4,058,060. It is, however, appreciated by those familiar with the art that many inclinometer designs may also be used for the same purpose. The gravity switches are generally used to indicate upward direction of an object, for example a doll. Then when the doll is upwards, for example in the standing position, the switch connects or disconnects a connection to indicate the upward positioning of the doll, and when the doll is help upside down, then the switch reverses the said connection. The sensitivity of gravity switches, i.e., the range of angular variation from the vertical direction that is considered to indicate upward or downward direction, varies and may even be adjustable. In the present roll angle sensor embodiments, gravity switches with a wide range of upward and downward direction sensitivities may be used as long as the wide range of the gravity switch does not cause the switch to react to vibration and other oscillatory motions of the specific projectile during the flight.

For the roll angle positioning of projectiles, hereinafter, when the projectile of FIGS. 3-6 are in their zero roll angle positioning, i.e., when the axis Z is vertical (the pointing marker 154 is up and in the vertical plane), then the projectile is considered to be in its upward position in roll.

As an example, the use of a gravity switch in the up-down indiscriminating embodiment of FIG. 6a to obtain an up-down discriminating embodiment is shown in FIG. 7a. In this embodiment, the gravity switch 168 is positioned somewhere in the projectile such that it would indicate upward projectile roll positioning within the range of −90 to 90 degrees of roll angle positioning of the projectile, and downward projectile roll positioning within the range of 90 to 270 degrees of roll angle positioning of the projectile. As previously mentioned, depending on the vibration and oscillatory motions of the projectile during the flight, the gravity switch sensitivity has to be selected to be less than the above (180 degrees) ranges. In many cases, total upward and downward ranges of 120 degrees or even less may be sufficient. However, if the complete 180 degree ranges of upward and downward roll positioning of the projectile needs to be identified, then more than one such gravity switches can be positioned at an appropriate tilt angles to cover the entire aforementioned range (even with certain overlapping). Such an alternative embodiment with two tilted gravity switches 169 are illustrated in FIG. 7b. With such an embodiment, the complete 180 degrees upward and downward roll angle positioning of the projectile can be determined even in the presence of substantial amount of vibration and oscillatory motions of the projectile during the flight. In general, certain amount of damping may also be provided in the gravity switches or at their projectile mounting to minimize the effect of projectile vibration. As a result, onboard monitoring of the differential output of the polarized RF cavity sensors 162 and checking of the status of the gravity switch 168 in the embodiment of FIG. 7a (or gravity switches 169 in the embodiment of FIG. 7b) would similarly provide the means to determine zero roll angle positioning (or if desired 180 degrees roll angle positioning) of the projectile. The said differential output of the polarized RF cavity sensors 162 can also be used by the projectile guidance and control system to roll the projectile to its desired upward (zero roll angle) or downward (180 degrees roll angle) roll positioning, and when desired to initialize onboard inertia sensors (specifically in roll) or to initiate other guidance and control actions.

In another embodiment, at least two GPS antennas are positioned an equal roll angle apart around and on the outside surface of the projectile body. The antennas may or may not be positioned at the same longitudinal distance from the projectile nose. In FIG. 8, such positioning of two GPS antennas 170 and 171 at 180 degrees apart are shown with the up-down indiscriminating embodiment of FIG. 6a to obtain an up-down discriminating embodiment. In FIG. 8, the GPS antenna 170 is shown to be mounted on the top surface and the GPS antenna 171 on the bottom surface of the projectile 150. During the flight, the GPS antennas are merely used to detect the GPS carrier signal (as opposed to locking into the carrier signal and detecting the transmitted information), with the sole purpose of detecting and determining the strength of the received signal. Obviously when the antenna 170 is on the top (nearly half portion of the projectile surface), it receives significantly stronger signal than the GPS antenna 171. The opposite will be the case when the GPS antenna is similarly on the top. As a result, from the relative strength of the GPS signal received at both antennas 170 and 171, the electronics onboard the projectile can readily determine the upward or downward roll positioning of the projectile. It is noted that since the GPS antennas 170 and 170 are only used to detect the GPS carrier signal and not GPS broadcasted information, and since such detection can be very rapidly obtained, there would be minimal delay in such upward and downward roll direction detection methods. This method may obviously be applied to any one of the aforementioned (up-down indiscriminating) embodiments.

Thus, onboard monitoring of the differential output of the polarized RF cavity sensors 162 and checking of the relative GPS signal strengths would provide the means to determine zero roll angle positioning (or if desired 180 degrees roll angle positioning) of the projectile. The differential output of the polarized RF cavity sensors 162 can also be used by the projectile guidance and control system to roll the projectile to its desired upward (zero roll angle) or downward (180 degrees roll angle) roll positioning, or when desired to initialize onboard inertia sensors (specifically in roll) or to initiate other guidance and control actions.

In the embodiments of FIGS. 3 and 5-8, the polarized RF cavity sensors are shown to be embedded in the back side of the projectile. It is, however, appreciated by those with ordinary skill in the art that the polarized RF cavity sensors may be embedded anywhere in the projectile (object), as long as it is not covered by materials that block the propagation of the emitted electromagnetic waves into the sensor cavity. The polarized RF cavity sensors may, for example and for the case of a projectile, be embedded anywhere on the body of the projectile, including in the fins, as long as the sensor cavities are directed such that they could receive the signal transmitted by the polarized RF reference source without distortion of its plane of polarization.

In certain applications, while the guidance and control system of a projectile equipped with one of the aforementioned embodiments is holding the projectile at certain roll angle positioning during the flight, it might become necessary to vary the set roll angle positioning of the projectile, i.e., it may become necessary to make upward roll angle positioning to be held instead at some angle (say at an angle of $\theta_Y=30$ degrees) with the vertical plane (rather than corresponding to zero roll angle positioning of the projectile). With the disclosed embodiments, this can be readily accomplished by properly rotating the polarized RF reference source 400 the same amount about the $Y_{ref}$ axis (FIG. 1), thereby producing an error (about the $\theta_y$ axis) onboard the moving object, which its guidance and control system would tend to correct, thereby causing the moving projectile to be rotated (rolled) the desired amount.

It is also appreciated by those familiar with the art that the various disclosed embodiments may be used in different gun-fired munitions, mortars and rockets and in fact any object to serve as one or more of: 1) auxiliary sensors, or 2) as redundant sensors to increase the accuracy of the main system sensors, or 3) as the means to set and/or reset inertia based sensors following settling time(s) and at certain time intervals to compensate for drifting, etc., and/or 4) for the moving object to receive commands for certain actions or for changing or modifying its trajectory, orientation, spin, etc.

The disclosed embodiments have been described for upward or downward (or any other desired) roll angle positioning of objects, such as a gun-fire munitions, mortar or rockets during the flight. It is, however, appreciated by those in the art that the disclosed embodiments may also be used to provide onboard measures of pitch and yaw angle positioning, example embodiments of which are provided in the following.

Figure 9:
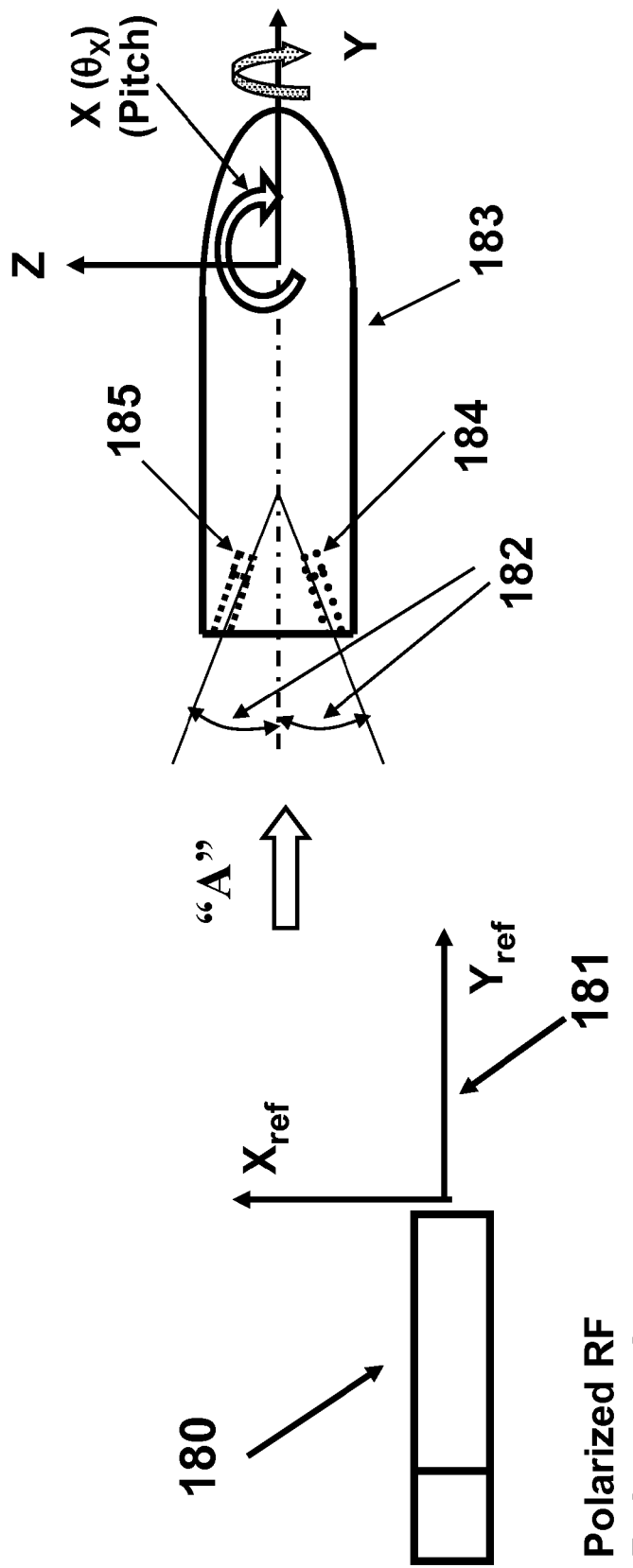
FIG. 9 illustrates components of an embodiment of the embedded position and orientation measuring system.
Figure 10:
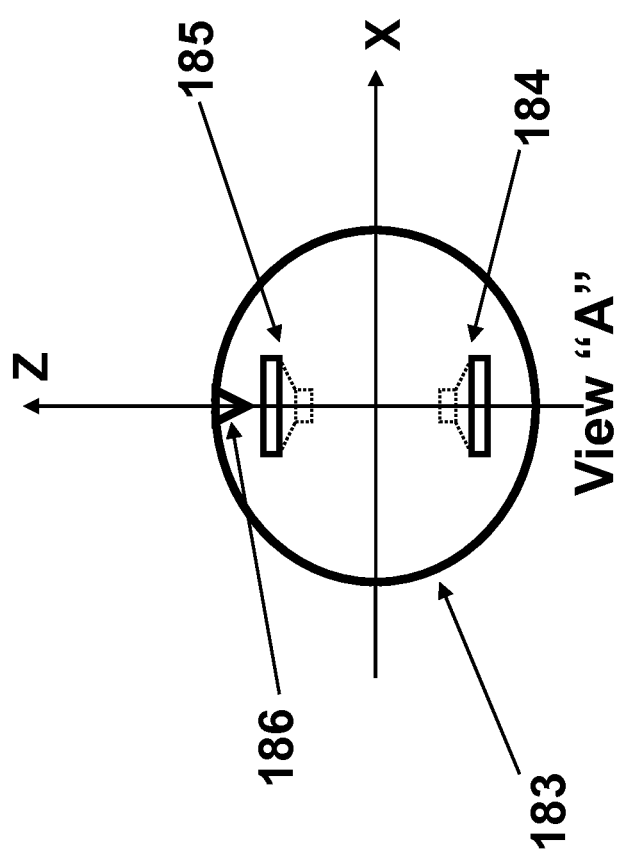
FIG. 10 illustrates the projectile of FIG. 9 at view A in FIG. 9 to illustrate the relative positioning and orientation of the two polarized RF cavity sensors.

In one embodiment shown in FIG. 9, the polarized RF reference source 180 (140 in FIG. 3) transmitting electromagnetic waves with polarization planes parallel to the $Y_{ref}Z_{ref}$ plane of the Cartesian reference coordinate system $X_{ref}Y_{ref}Z_{ref}$ 181 (141 in FIG. 3) is still used. It is noted that in FIG. 3, the plane of polarization $Y_{ref}Z_{ref}$ is vertically oriented whereas in the present embodiment, the plane of polarization $Y_{ref}Z_{ref}$ is considered to be horizontal (both with respect to the earth). The projectile 183 (similar to the projectile 132 in FIG. 3) is considered to be positioned far-field relative to the polarized RF reference source 180 during its flight. Two identical polarized RF cavity sensors 184 and 185 similar to those described in previous roll angle positioning embodiments are embedded into the projectile at an angle 182, symmetrically with respect to the projectile-fixed XY plane (in FIG. 9, the projectile is considered to be at zero roll and yaw angle), making equal angles 182 with the XY plane. The view "A" (FIG. 9) is shown in FIG. 10 to illustrate the relative positioning and orientation of the two polarized RF cavity sensors 184 and 185. As can be observed in FIGS. 9 and 10, when the pitch angle ($\theta_x$) is zero, then the signals received by the two polarized RF cavity sensors 184 and 185 are the same, making their differential magnitude measurement to be zero. Similarly, any variation of the differential measurement from zero is a measure of the deviation of the pitch angle from its zero angular positioning. The said differential output of the polarized RF cavity sensors 184 and 185 can then be used by the projectile guidance and control system to rotate the projectile to its zero pitch angle positioning to, for example, initialize certain onboard pitch angle measuring sensors or to initiate other guidance and control actions.

In the above embodiment, and without intending to provide any restriction, the projectile is considered to be at zero roll angle—preferably brought to such roll angle positioning by the projectile using one of the aforementioned roll angle positioning embodiments. It is, however, appreciated by those with ordinary skill in the art that zero (or any other set) pitch angle positioning can be achieved at any arbitrary roll and yaw angles since when the pitch angle is zero, the signal received by the two polarized RF cavity sensors 184 and 185 would be the same (their differential magnitude measurement will be zero) no matter at what roll and yaw angle the projectile may be. It is also appreciated by those with ordinary skill in the art that if zero differential magnitude measurement is desired to be obtained at any other pitch angle than zero, then the plane of symmetry (in the case of the embodiment of FIGS. 9 and 10 the plane XY) only need to be oriented the desired pitch angle from the plane XY of the projectile.

In the embodiment of FIGS. 9 and 10, the polarized RF reference source 180 is oriented and the polarized RF cavity sensors 184 and 185 are oriented in the projectile such that the magnitude of their differential received signal is zero at zero pitch angle positioning of the projectile relative to earth. It is, however, appreciated by those in the art that by orienting the plane of polarization of the polarized RF reference source to be vertical (the same as the polarized RF reference source 140 in FIG. 3), and by positioning the polarized RF cavity sensors symmetrically about the plane YZ (instead of plane XY in FIGS. 9 and 10), with similar angular orientations 182 shown in FIG. 9, then the magnitude of the differential received signal measurement of the two polarized RF cavity sensors becomes zero only when the projectile is at its zero yaw positioning. The said differential output of the polarized RF cavity sensors can then be used by the projectile guidance and control system to rotate the projectile to its zero yaw angle positioning to, for example, initialize certain onboard yaw angle measuring sensors or to initiate other guidance and control actions.

Figure 11:
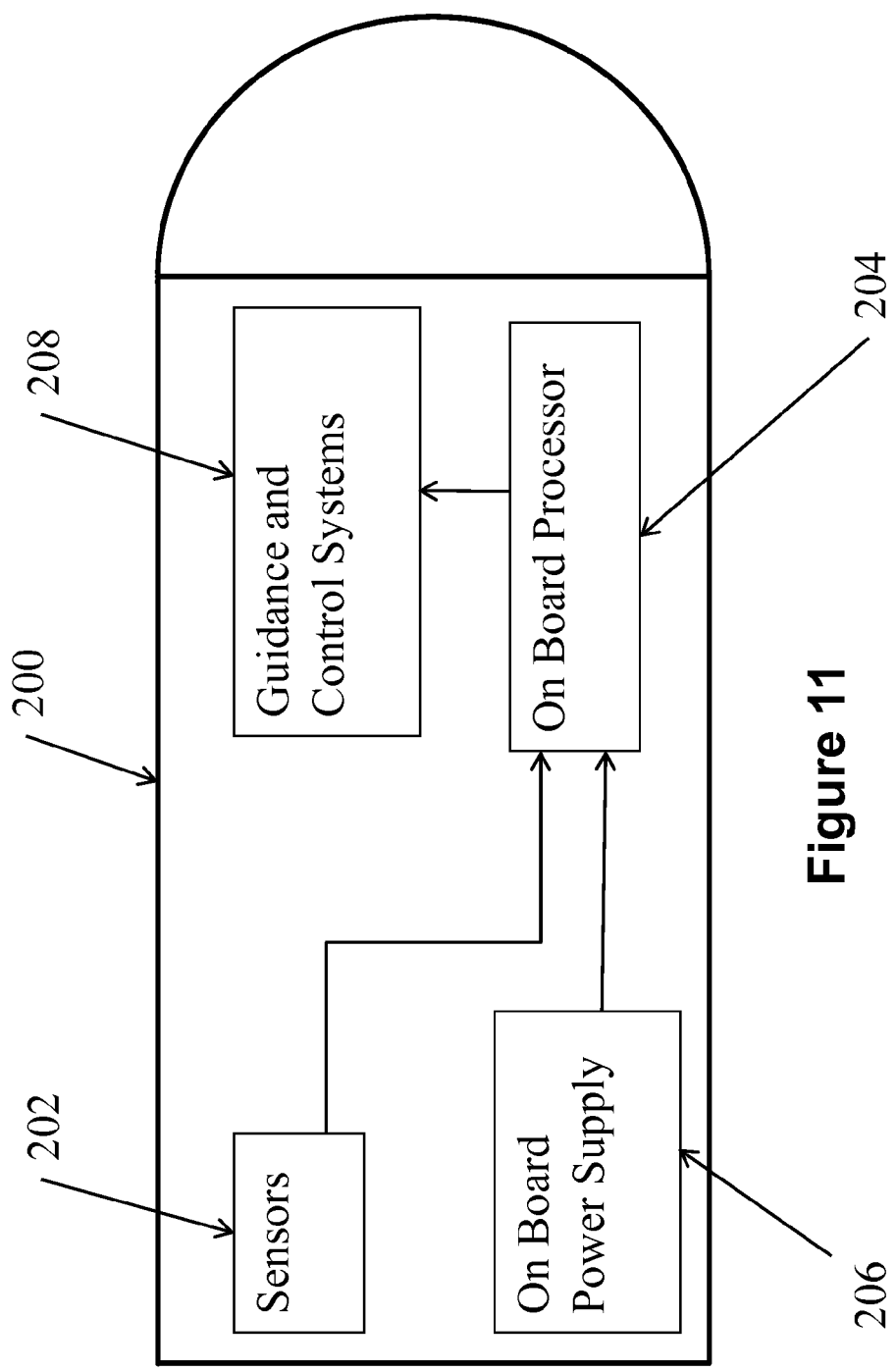
FIG. 11 illustrates an embodiment of a projectile having the sensors and a control system for carrying out the methods described herein.

Referring now to FIG. 11, there is shown a projectile casing 200 having any one of the sensor configurations described above, generally referred to by reference numeral 202. Reference numeral 202 can be the RF sensor(s) described above, gravity switches 169, GPS receivers 170 and any combination thereof. An output of such sensor(s) 202 is input into an on-board processor 204 which is powered by an on-board power supply 206. The on board processor makes the determinations discussed above and decides whether any corrective action is necessary based on predetermined criteria, which can be provided in software in memory operatively connected to the processor 204. If the processor 204 decides that a corrective action is necessary based on the sensor 202 output and the resulting determinations, the processor 204 directs the guidance and control systems 208 (such as inertia sensors, control surfaces or thrusters) accordingly. Such control can be a feedback loop where such determination is made every predetermined time period and the guidance and control systems 208 are controlled until the sensor output is such as to correspond to an acceptable or desired orientation of the projectile 200.

Depending on the application and on the position of the polarized RF cavity sensors on the projectile, the sensor cavities may be filled with air or a solid (or liquid) dielectric. In addition to the features of the polarized RF cavity sensors that have been previously enumerated, the embedded nature of the cavity sensors enables a strong structure for munitions using such sensors. In addition, the relatively simple design of the polarized RF cavity sensors also reduces the implementation costs.

It is appreciated by those skilled in the art that the reference source 400 (ground station) may itself be moving, FIGS. 1-2. The reference source(s) 400 at the ground station can and may be used to receive signals transmitted from the object (for example, projectile 132 for the case of the embodiment of FIG. 3) via the onboard polarized RF sensor cavities themselves functioning as the transmitting antennas or using other transmission antennas. The information that is transmitted back may include any data generated by the onboard components such as other sensors, seekers, actuation devices, control system, etc., during the system and engineering and development activities as well as in the fielded system scenarios.

While a guided object is traveling along a prescribed trajectory, it is often desirable to change or modify the prescribed trajectory. This is also the case when the object is directed to move to or towards a target position without specifying a desired path towards the indicated target position. The decision to vary the trajectory and/or the target position is considered to be made at a planning station and not onboard the moving object itself. For example, when a robot is being guided remotely to a desired object, if the target object is moved, the specified path can be corrected at a planning station and transmitted to the mobile robot. This also obviously applies to situations in which the target object or position or the desired trajectory is changed for some other reasons.

Alternatively, the robot may have been equipped with sensory systems to recognize or follow the movement of the target object, and internally adjust its path of motion to accommodate variations in the target object position. Such sensors are generally classified as homing sensors and also include the class of homing sensors that are based on following a provided signal, for example, riding a laser beam or following the reflection of such a beam off the target object provided by, for example, a forward observer. For purposes of the methods and systems disclosed herein, such trajectory and/or target position correction is not to be based on such homing sensory devices, even though the moving object could be equipped with such homing sensory devices, which are customarily used once the moving object is relatively close to its target object or position.

The method for the development of roll angle measuring sensors disclosed can be described, for example, by its application to one of the embodiments of FIG. 7a or 7b or 8. For example, consider the embodiment of FIG. 7a as redrawn in the schematic of FIG. 12. In this embodiment, the gravity switches 169 are positioned in the projectile such that upward projectile roll positioning (i.e., zero roll angle positioning) of the projectile can be differentiated from its 180 degrees (or 90 or 270 degrees) roll angle positioning as previously described. Then onboard monitoring of the differential output of the polarized RF cavity sensors 162 and checking of the status of the gravity switches 169 in the embodiment of FIG. 7a would provide the means to determine zero roll angle positioning (or if desired 180 degrees roll angle positioning) of the projectile. The differential output of the polarized RF cavity sensors 162 can also be used by the projectile guidance and control system to roll the projectile to its desired upward (zero roll angle) or downward (180 degrees roll angle) roll positioning, and when desired to initialize onboard inertia sensors (specifically in roll) or to initiate other guidance and control actions.

Figure 12:
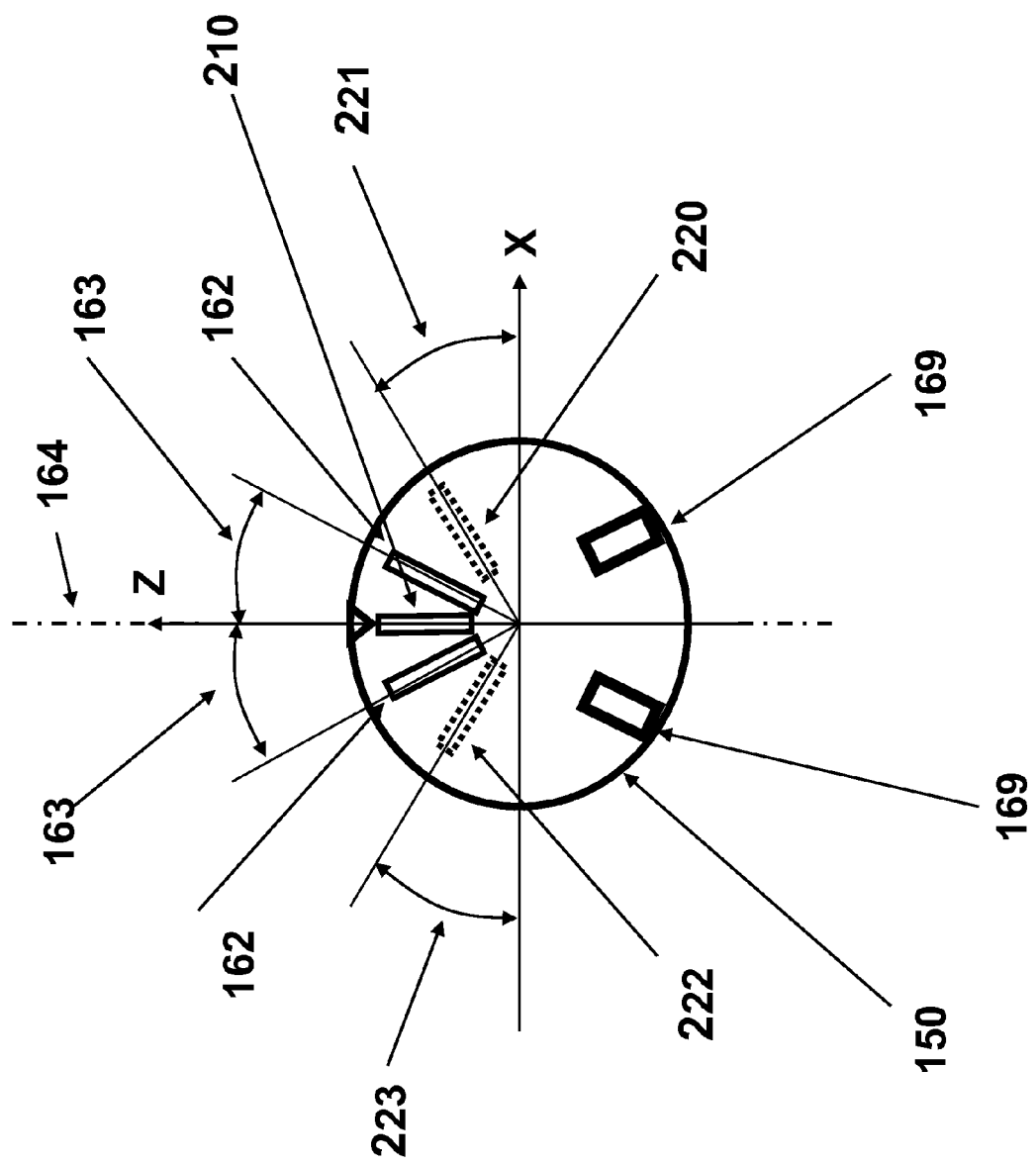

In the method, a third polarized RF cavity sensor 210 is also provided and is positioned parallel to the Z axis (i.e., the YZ plane) as shown in FIG. 12. It is noted that since the plane of polarization of the polarized RF reference source is parallel to the vertical plane, the magnitude of the signal received by the polarized RF cavity sensor 210 is maximum at zero (and 180) degrees roll angle positioning of the projectile. By having selected three identical polarized RF cavity sensors (two sensors 162 positioned symmetrically about the YZ plane and the sensor 210), when the projectile is positioned at its zero roll angle, three points on a curve (function) describing the relationship between the roll angle positioning of the projectile (i.e., the roll angle positioning of the polarized RF cavity sensor 210) and the magnitude of the received signal at the sensor 210 is obtained. Such a function is in general a symmetrical curve with the maximum point at zero roll angle positioning of the sensor 210, and continuously decreasing as the roll angle deviates in either direction from zero roll angle positioning of the sensor 210, becoming zero at 90 degrees (and −90 or 270 degrees) roll angle positioning of the projectile. Hereinafter, this curve is referred to as the "roll angle curve".

Figure 13:
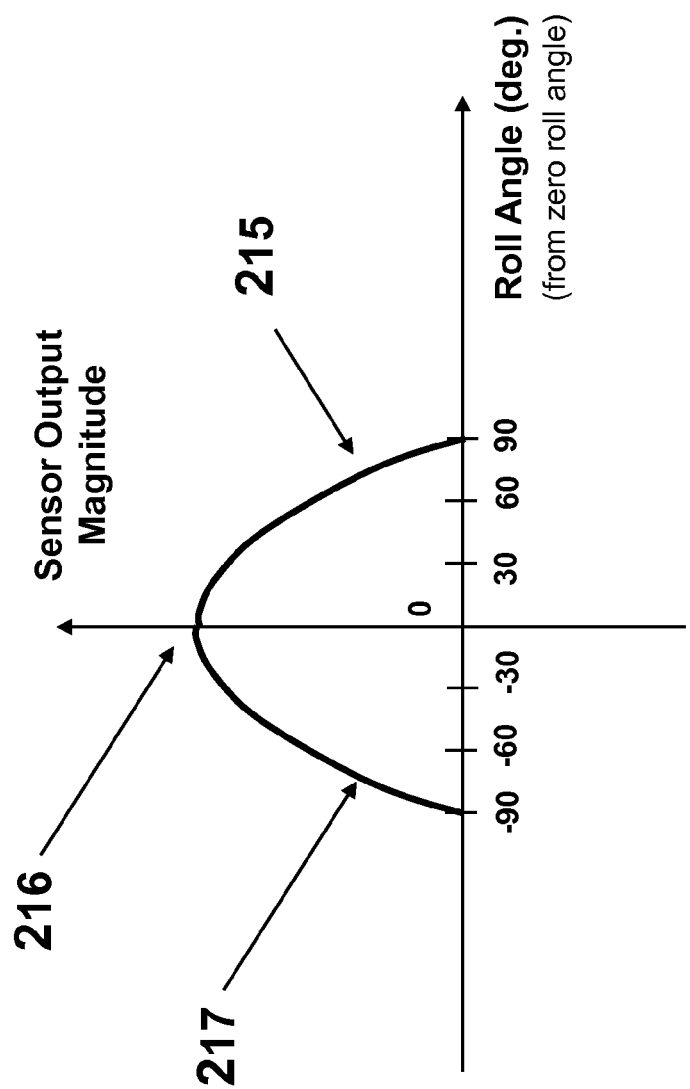
FIG. 13 illustrates a roll angle curve describing the relationship between the magnitudes of the output of the sensor as a function of roll angle positioning of the projectile.

A typical roll angle curve 217 describing the relationship between the magnitudes of the output of the sensor 210 as a function of roll angle positioning of the projectile is shown in FIG. 13. The sensor 210 output magnitudes as a function of the sensor 210 roll angle positioning about 180 degrees roll angle positioning of the sensor 210 will be identical. The shape of the roll angle curve 217 will stay essentially the same as the distance between the polarized RF source 140 (FIG. 3) to the projectile 150 (FIGS. 3 and 12) is increased, however, the magnitude of the received signal (e.g., the magnitude of the maximum signal output 216 at zero roll angle positioning of the projectile) is decreased (generally the magnitude of the signal received at the sensor is proportional to the inverse of the distance between the reference source 140 (FIG. 3) and the sensor 210 squared.

In general, the shape of the magnitude of the sensor 210 output curve 217 is obtained by measuring it in a laboratory setting (or is approximately determined by using computer modeling and simulation). Then during the flight, the magnitude of the output of the sensor 210 is measured at zero (or 180) degrees roll angle positioning of the projectile, and is used to "scale" the curve 217 to provide the relationship between the roll angle positioning of the projectile and the magnitude of the output of the sensor 210 at the time of measurement (i.e., at the given distance of the projectile 150 from the polarized RF reference source 140—FIG. 3). Then as the projectile rolls, its roll angle positioning can be calculated from the curve 217 by measuring the magnitude of the output of the sensor 210.

In an alternative embodiment, during the flight, the magnitude of the output of the two polarized RF cavity sensors 162 as well as the output of the polarized RF cavity sensor 210 may be used when the projectile is at its zero (or 180) degrees roll angle positioning to "scale" the curve 217 to provide the relationship between the roll angle positioning of the projectile and the magnitude of the output of the sensor 210 at the time of measurement. Then as the projectile rolls, its roll angle positioning can be calculated from the curve 217 by measuring the magnitude of the output of the sensor 210. By utilizing three point sensor output magnitude reading (instead just one reading of the magnitude of the output of the sensor 210), the effects of noise and measurement error on the roll angle calculation is significantly reduced.

The method described above required that during the flight, the projectile be brought to its zero (or 180) degrees roll positioning in order to obtain reading of the magnitude of the output of the sensor 210 to perform the aforementioned "scaling" of the curve 217 profile (here also, by using the magnitudes of the output of the other two sensors 162 to make a three point "scaling of the curve 217 will increase the precision of the process and reduce the effects of noise and measurement error on the obtained results).

In certain applications, projectiles spin in roll (particularly for stabilization purposes) during the flight at certain more or less constant or slowly varying speed. In such applications, the aforementioned "scaling" of the curve 217 can be performed at relatively short time intervals and the resulting curve 217 can be used between the "scaling" events for the calculation of the roll angle positioning of the projectile. This method will provide the means to obtain fairly accurate roll angle positioning of the projectile if the projectile spins at relatively high rates or if the speed of travel of the projectile is relatively low. If the projectile is spinning in roll but with a relatively low rate or if the speed of travel of the projectile is relatively high, then a simple algorithm may be used to account for the change in the projectile distance from the reference source 140 (FIG. 3) in between consecutive "scaling" events of the curve 217. This can be done in a number of ways. For example, if the speed of travel of the projectile and its distance to the reference source is known, then a rate of change in the maximum magnitude 216 of the curve 217 can be estimated and used to correct the curve 217 profile at any given time between the "scaling" events (e.g., using a linear interpolation algorithm). Alternatively, if the spin rate is high enough and relatively constant in between "scaling" events, then the amount of reduction in the maximum magnitude 216 of the curve 217 can be estimated for the upcoming "scaling" event and used to "scale" the profile of the curve 217 up to the upcoming "scaling" event. Then a rate of change in the maximum magnitude 216 of the curve 217 can be estimated and used to correct the curve 217 profile at any given time between the "scaling" events (e.g., using a linear interpolation algorithm).

If the projectile is not spinning or is spinning at a relatively low or highly varying rate, then the aforementioned methods of estimating the maximum magnitude 216 of the curve 217 of the output of the polarized RF cavity sensor 210 becomes cumbersome and inefficient since the projectile must be periodically maneuvered to its zero roll angle positioning for the aforementioned "scaling" purposes.

It is noted that the three polarized RF cavity sensors 162 and 210 do not have to be identical to serve as the means to generate the aforementioned roll angle curve 217. If they are not identical, then the magnitude of their output at zero roll angle positioning of the projectile needs to be normalized, i.e., weighted, to provide the algorithm used to generate the roll angle curve 217 with their equivalent identical reading. This task (calibration) is preferably performed in a laboratory setting.

In another embodiment, in addition to the pair of polarized RF cavity sensors 162 and the polarized RF cavity sensor 210, one or more polarized RF cavity sensor are positioned at other roll angle positioning. In the schematic of FIG. 12, two additional polarized RF cavity sensors 220 and 222 are positioned at the angular positions indicated by the angles 221 and 223, respectively. Then during the aforementioned "scaling" events, the magnitude of the output of all the provided sensors (in this case all the five sensor outputs) can be used to more accurately "scale" (i.e., reconstruct) the roll angle curve 217 with its peak value 216. It is appreciated by those familiar with the art that by using more sensor readings will make the constructed roll angle curve 217 more accurate and less susceptible to the effects of noise and measurement errors.

Another embodiment takes advantage of the particular nonlinear and unimodal shape of the roll angle curve 217 (monotonically decreasing from the maximum point 216 to the right—i.e., from zero to 90 degrees roll angle—and going to the left—i.e., from zero down to −90 degrees roll angle). In this embodiment, at any given point of time during the flight and at any roll angle positioning of the projectile, the magnitudes of the output of the three polarized RF cavity sensors 162 and 210 are measured and used to match the properly scaled roll angle curve 217. This is generally done numerically using methods such as least square approximation to best match the measured sensor values to the properly scaled roll angle curve 217, noting also that at +90 and −90 degrees of roll angles the output signals are zero. It is also appreciated by those familiar with the art that by having more measurements, i.e., by using additional polarized RF cavity sensors such as those indicated by numerals 220 and 222, a better approximation of the actual roll angle curve 217 is obtained and the effects of noise and measurement errors are minimized. Then once the properly "scaled" roll angle curve is obtained, the position of the polarized RF cavity sensors on the curve will indicate the actual roll angle positioning of the projectile at that instant of time.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

The invention claimed is:

1. A method for onboard determination of a roll angle of a projectile, the method comprising:

transmitting a polarized RF signal from a reference source, with a predetermined polarization plane;

receiving the signal at a pair of polarized RF sensor cavities positioned symmetrically on the projectile with respect to a reference roll position on the projectile;

measuring a difference between an output of the pair of polarized RF sensor cavities resulting from the received signal to determine zero output roll positions of the projectile; and comparing an output of the pair of polarized RF sensor cavities at each of the zero output positions to determine when the projectile is parallel to the predetermined polarization plane.

2. The method of claim 1, wherein the predetermined polarization plane is vertical.

3. The method of claim 1, further comprising analyzing an output of at least one additional sensor positioned on the projectile to determine whether the roll angle position of the projectile is in one of a first or second direction in the predetermined polarization plane, where the second direction is 180 degrees from the first direction.

4. The method of claim 3, further comprising controlling the projectile based on the determined roll angle positioning.

5. The method of claim 3, wherein the additional sensor is selected from a group consisting of a gravity switch, inclinometer, GPS receiver, and another polarized RF sensor cavity.

6. The method of claim 1, further comprising configuring the pair of polarized RF sensor cavities such that the output is used to determine a pitch of the projectile relative to a longitudinal axis of the projectile.

7. A projectile comprising:

a casing;

a pair of polarized RF sensor cavities positioned symmetrically on the casing with respect to a predetermined polarization plane; and a processor configured to:
- measure a difference between an output of the pair of polarized RF sensor cavities resulting from the received signal to determine zero output roll positions of the projectile; and
- compare an output of the pair of polarized RF sensor cavities at each of the zero output roll positions to determine when the projectile is parallel to the predetermined polarization plane.

8. The projectile of claim 7, further comprising at least one additional sensor positioned on the projectile and the processor is further configured to analyze an output of the at least one additional sensor to determine whether the roll angle position of the projectile is in one of a first or second direction in the predetermined polarization plane, where the second direction is 180 degrees from the first direction.

9. The projectile of claim 8, further comprising a guidance and control system under the control of the processor for controlling the projectile based on the determined roll angle positioning.

10. The projectile of claim 8, wherein the additional sensor is selected from a group consisting of a gravity switch, inclinometer, GPS receiver, and another polarized RF sensor cavity.

11. The projectile of claim 7, wherein the pair of polarized RF sensor cavities are configured such that the output is used to determine a pitch of the projectile relative to a longitudinal axis of the projectile.

12. A method for onboard determination of a roll angle of a projectile, the method comprising:
- transmitting a polarized RF signal from a reference source, with a predetermined polarization plane;
- receiving the signal at two polarized RF sensor cavities positioned orthogonally with respect to each other on the projectile and with respect to a reference roll position on the projectile; and
- determining when the projectile is parallel to the predetermined polarization plane based on an output of the two polarized RF sensor cavities.

* * * * *